(12) United States Patent
Yao et al.

(10) Patent No.: US 7,606,271 B2
(45) Date of Patent: Oct. 20, 2009

(54) COMMUNICATION TIMING CONTROL APPARATUS, COMMUNICATION TIMING CONTROL METHOD, NODE, AND COMMUNICATION SYSTEM

(75) Inventors: Taketsugu Yao, Osaka (JP); Masaaki Date, Osaka (JP); Yukihiro Morita, Saitama (JP); Shigeru Fukunaga, Hyogo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 562 days.

(21) Appl. No.: 11/072,409

(22) Filed: Mar. 7, 2005

(65) Prior Publication Data
US 2005/0195827 A1 Sep. 8, 2005

(30) Foreign Application Priority Data
Mar. 8, 2004 (JP) .............................. 2004-064627

(51) Int. Cl.
H04J 3/06 (2006.01)
(52) U.S. Cl. .................................................... 370/507
(58) Field of Classification Search ................. 370/337, 370/347, 401, 395.4, 304, 305, 326, 389, 370/400, 503, 507, 509–512; 375/340, 354; 379/172; 455/436; 710/66
See application file for complete search history.

(56) References Cited

U.S. PATENT DOCUMENTS 6,731,624 B1 5/2004 Maekawa et al.
6,748,040 B1* 6/2004 Johnson et al. ............. 375/354
7,522,640 B2 4/2009 Date et al.
2001/0036167 A1* 11/2001 Menon et al. ............... 370/337
2003/0117991 A1* 6/2003 Beyer et al. ................. 370/349
2005/0124344 A1* 6/2005 Laroia et al. ................ 455/436

FOREIGN PATENT DOCUMENTS

| JP | 07143558 A | 6/1995 |
| JP | 2000252951 A | 9/2000 |
| JP | 2003167043 | 6/2003 |
| JP | 2005094663 A | 4/2005 |

OTHER PUBLICATIONS

Waiyaresu LAN Akitekucha (Wireless LAN Architecture) edited by Matsushita et al., Kyoritsu Shuppan, 1996, pp. 49-71.

* cited by examiner

*Primary Examiner*—Chirag G Shah
*Assistant Examiner*—Yong Zhou
(74) *Attorney, Agent, or Firm*—Venable LLP; Michael A. Satori

(57) ABSTRACT

Each node in a communication system receives state variable signals from other nodes indicating the internal operating states or internal timing of the other nodes, and transmits a state variable signal indicating its own internal operating state or timing. Each node also determines whether each received state variable signal is valid. Transitions in the internal operating state or timing of a node take place at a basic transition rate but at times adjusted according to the valid state variable signals received from other nodes. A group of neighboring nodes transmitting data signals can thereby autonomously reach a steady state in which their data signals do not collide, without having their timing control disrupted by reflected state variable signals or other invalid state variable signals.

9 Claims, 14 Drawing Sheets

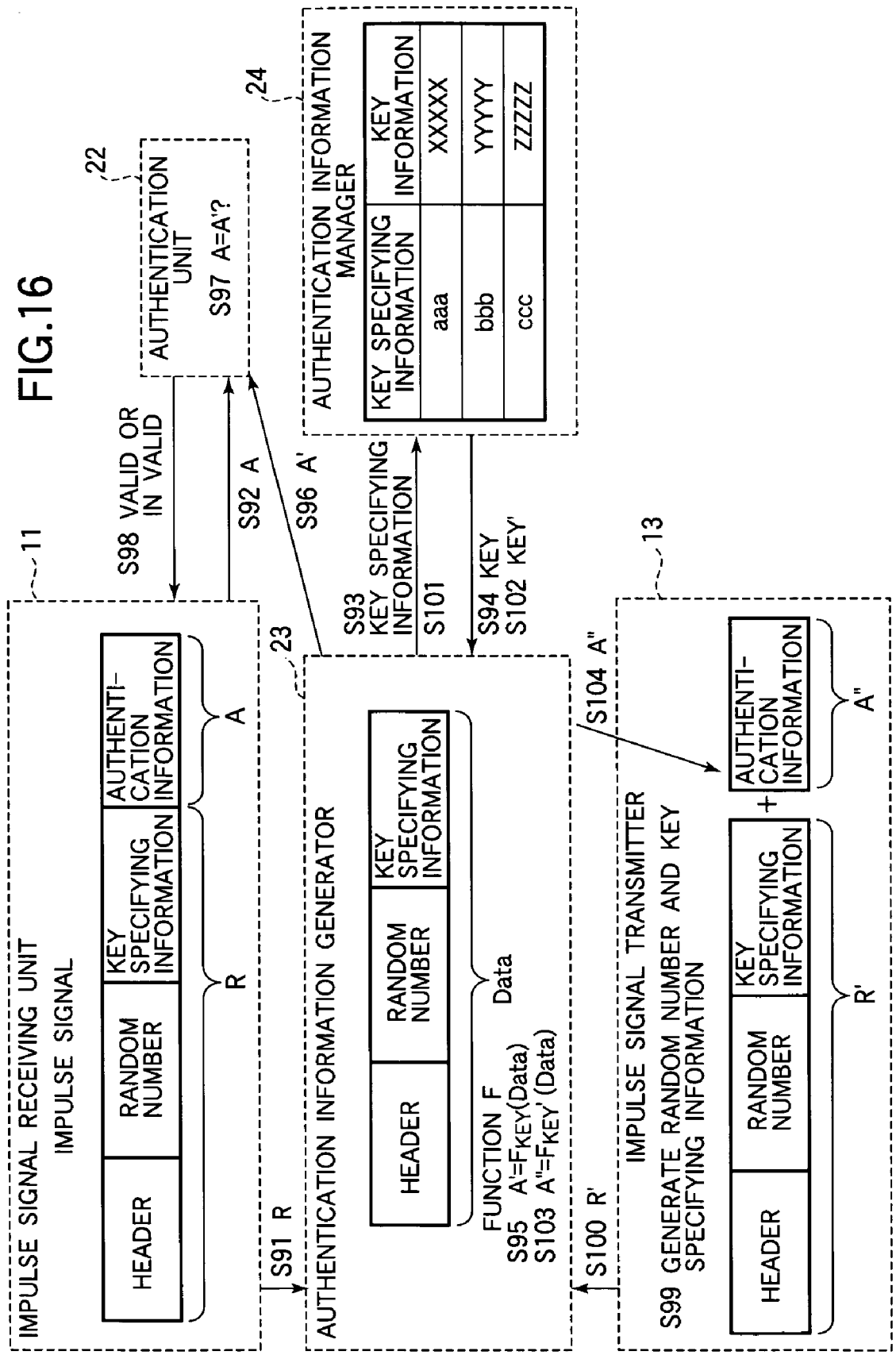

COMMUNICATION TIMING CONTROL APPARATUS, COMMUNICATION TIMING CONTROL METHOD, NODE, AND COMMUNICATION SYSTEM

BACKGROUND OF THE INVENTION

1. Field of the Invention

The present invention relates to a communication timing control apparatus, a communication timing control method, a node, and a communication system, more particularly to the avoidance of data transmission collisions in a communication system with a plurality of nodes.

2. Description of the Related Art

Known methods by which a plurality of spatially distributed nodes can transmit data without collisions include time division multiple access (TDMA) and carrier sense multiple access (CSMA), the latter including carrier sense multiple access with collision avoidance (CSMA/CA) and carrier sense multiple access with collision detection (CSMA/CD). A discussion of these methods can be found in, for example, Waiyaresu LAN Akitekucha (Wireless LAN Architecture), edited by Matsushita and Nakagawa, Kyoritsu Shuppan, 1996, pp. 47, 53-59, and 69 (in Japanese).

In the CSMA methods, a node with data to transmit determines whether other nodes are transmitting by sensing their carrier signals, and waits until no other node is transmitting before transmitting itself. A disadvantage of CSMA is that it severely restricts the number of channels that can be used simultaneously.

In the TDMA method, different time slots are assigned to different nodes, and each node transmits in its own assigned time slot. TDMA can provide more simultaneous communication channels than CSMA, but when the set of communicating nodes changes dynamically, an administrative node must reassign the time slots dynamically.

A weakness of the TDMA system is that if the administrative node malfunctions, the entire communication system may be brought down. The process by which time slots are assigned dynamically to nodes is also complex, making it difficult to respond promptly to changing conditions.

It would be desirable to have a method and apparatus for controlling communication timing in which each node could communicate effectively without having to receive timing control instructions from an administrative node.

SUMMARY OF THE INVENTION

An object of the present invention is to provide a communication timing control method that avoids signal collisions in a communication system by autonomous control of the communicating nodes.

Another object of the invention is to enable the nodes to adjust flexibly and autonomously to changing conditions in the communication system.

Still another object is to prevent signal reflection from disturbing communication timing control.

Yet another object is to prevent communication timing control from being disturbed by signals from sources that are not part of the communication system.

In the invented communication timing control method, each node in the communication system receives, from at least one other node in the communication system, input state variable signals indicating an operating state or operating timing of the other node. The node decides whether each of the input state variable signals is valid, generates transitions in its internal operating state or operating timing at a basic transition rate but at times adjusted according to the valid input state variable signals received from the other nodes, generates an output state variable signal according to these transitions, and transmits the output state variable signal to the other nodes.

The validity of the input state variable signals may be determined by distinguishing between input state variable signals received directly from other nodes in the communication system and input state variable signals received by reflection, by using authentication information to decide whether each input state variable signal was actually transmitted from another node in the communication system, or by both of these methods.

Reflected input state variable signals can be identified from timing statistics or from identifying information added to the state variable signals. A count value, a random number, or a node identifier may be added as identifying information.

By adjusting their internal transition timings, a group of neighboring nodes can autonomously reach a steady state in which the state variable signals transmitted from different nodes are separated by intervals that can be used as time slots for data communication. When the system undergoes a change, the nodes affected by the change can adjust autonomously and reach a new steady state. By determining the validity of the state variable signals, the nodes can avoid having their communication timing control disturbed by reflected signals and other extraneous signals.

The invention also provides a communication timing control apparatus employing the invented method, and a communication system with a plurality of nodes, each including the invented communication timing control apparatus

BRIEF DESCRIPTION OF THE DRAWINGS

In the attached drawings:

FIG. 16 shows the flow of operations involving the authentication unit, authentication information generator, and key information manager at a node in the seventh embodiment.

DETAILED DESCRIPTION OF THE INVENTION

Figure 1:
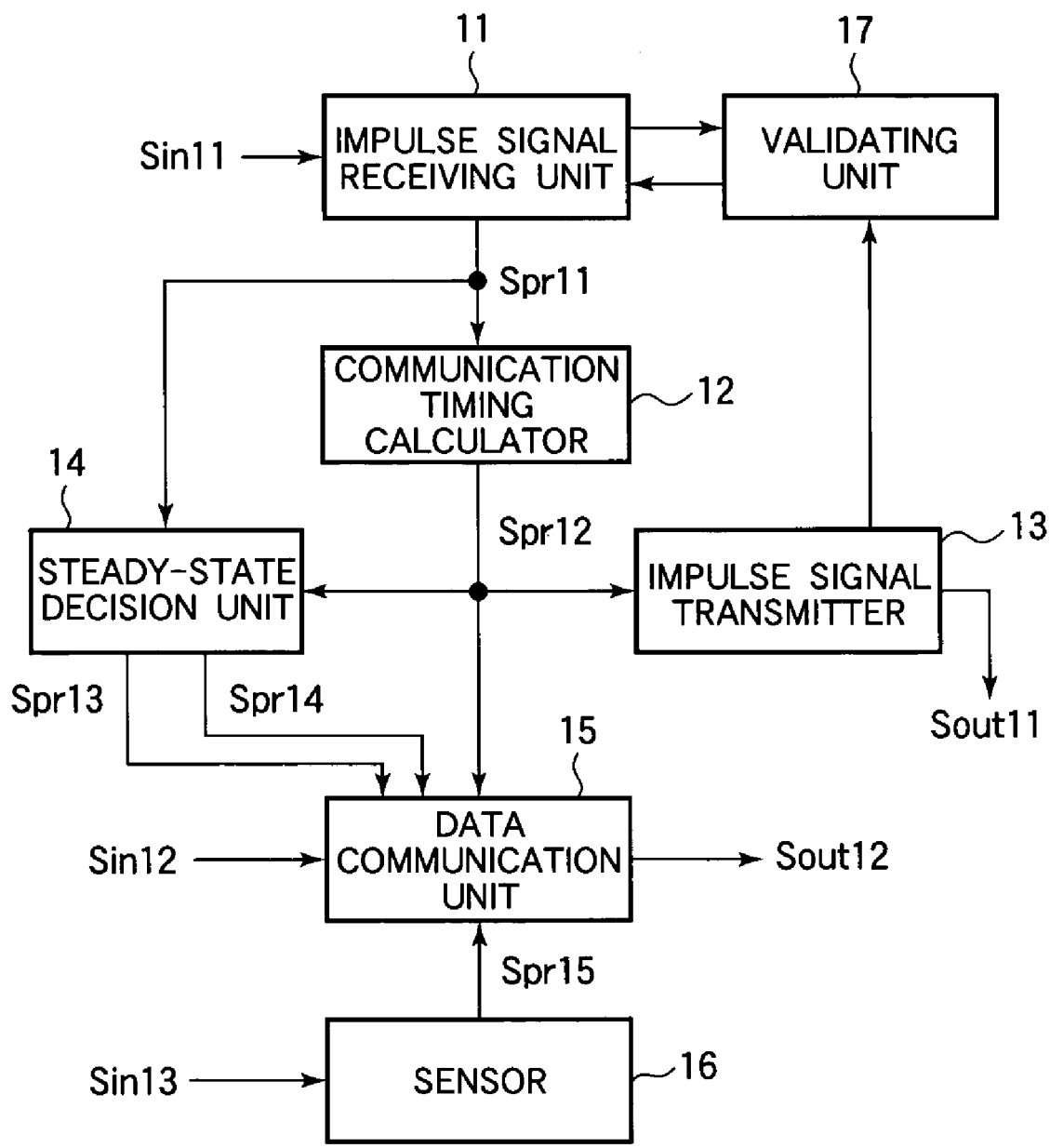
FIG. 1 is a block diagram showing the internal functional structure of a node according to a first embodiment of the present invention.

Embodiments of the invention will now be described with reference to the attached drawings, in which like elements are indicated by like reference characters. For brevity, the state variable signals will be referred to as impulse signals even though, in the second and subsequent embodiments, they include identifying information or authentication information.

Each of the embodiments pertains to a communication system in which a plurality of spatially distributed nodes perform wireless data communication in self-assigned time slots. Each node also generates and transmits impulse signals. Neighboring nodes interact by detecting each other's impulse signals, and adjust the timing of their time slots accordingly.

First Embodiment

In the first embodiment, each of the nodes is assumed to remain substantially stationary during communication.

Each of the plurality of nodes has the functional block structure shown in FIG. 1. The node 10 in FIG. 1 comprises an impulse signal receiving unit 11, a communication timing calculator 12, an impulse signal transmitter 13, a steady-state decision unit 14, a data communication unit 15, a sensor 16, and a validating unit 17. The impulse signal receiving unit 11, communication timing calculator 12, impulse signal transmitter 13, steady-state decision unit 14, and validating unit 17 operate as a communication timing control apparatus.

The impulse signal receiving unit 11 receives input impulse signals Sin11 transmitted by neighboring nodes. The impulse signals in the first embodiment are timing signals having, for example, a Gaussian waveshape, not including any data or address information. The neighboring nodes include, for example, all nodes within communication range. The impulse signal receiving unit 11 sends each received input impulse signal Sin11 to the validating unit 17, and receives from the validating unit 17 the result of a decision as to whether the input impulse signal Sin11 is valid or invalid. If the input impulse signal Sin11 is valid, the impulse signal receiving unit 11 outputs a received impulse signal Spr11; otherwise, it discards the impulse signal. The received impulse signal Spr11 may be a reshaped version of the input impulse signal Sin11, or a signal generated from the input impulse signal Sin11.

The communication timing calculator 12 generates and outputs a phase signal Spr12 that determines the transmission timing of its own node, based on the received impulse signal Spr11 furnished from the impulse signal receiving unit 11. The phase signal Spr12 at the i-th node has a phase value θi (t) which is advanced at successive times t by the amount given in equation (1) below. This equation models a type of nonlinear oscillation. In the absence of received impulse signals Spr11, the phase advances at a basic transition rate given by an angular frequency parameter ω. In the presence of received impulse signals Spr11, the phase is adjusted according to the sum term on the right of the equal sign. The invention is not limited to the use of this particular model; other equations that model nonlinear oscillation may be used instead. The value (θ$_i$(t)) of the phase signal Spr12 may be regarded as a state variable of the node, expressing its internal timing or operating state.

$$d\theta_i(t)/dt = \omega + \sum_{k=1}^{N} P_k(t) \cdot R(\theta_i(t), \sigma(t)) \tag{1}$$

$$R(\theta_i(t), \sigma(t)) = \sin(\theta_i(t) + \sigma(t)) \tag{2}$$

$$\sigma(t) = \pi + \phi(t)$$

$\theta_i(t)$: value of phase signal of node $i$ $\omega$: natural angular frequency parameter $P_k(t)$: received impulse signal received from node $k$ $R(\theta_i(t), \sigma(t))$: phase response function $\phi(t)$: random noise function This equation (1) is essentially a rule for generating variations in the basic rhythm of operation of the i-th node in response to the received impulse signal Spr11. The variable t represents continuous time, and ω represents the natural angular frequency of the node's rhythm of operation. It will be assumed in this embodiment that ω has a uniform predetermined value throughout the system. The function $P_k$(t) expresses the value at time t of the received impulse signal Spr11 output from the impulse signal receiving unit 11 for the impulse signal received from neighboring node k (k=1 to N). N is the total number of neighboring nodes within spatial receiving range. The function R(θi (t), σ(t)) is a phase response function that determines how the basic period or rhythm is varied in response to the received impulse signals Spr11, and may be defined as in, for example, equation (2), which adds random noise in complementary phase to the phase value θi (t).

Equations (1) and (2) have a nonlinear operating characteristic that attempts to bring neighboring nodes into a complementary phase relationship that can be used to avoid collisions. More specifically, if two neighboring nodes are operating in phase with each other, so that they have the same transmission timing, for example, and their transmissions collide, equations (1) and (2) operate so as to move the nodes away from this timing relationship, so that they operate with an appropriate phase difference.

The constant term π (radians) in the function σ(t) in equation (2) attempts to establish a complementary phase relationship between neighboring nodes. The random noise function φ(t) gives the nonlinear characteristic a random variability by generating noise (random values) according to, for example, a Gaussian probability distribution with a mean value of zero. The random variability is added to keep the system from becoming trapped in a locally stable state (local solution) other than the desired stable state (optimal solution).

The phase response function R(θ$_i$(t), σ(t)) in equation (2) above is a sine function, but the invention is not limited to the use of a sine function, and the constant term in the function σ(t) is not limited to π. The constant term may be any constant λ other than zero or an even multiple of π (e.g., any value in the range 0<λ<2π). If a constant other than π is used, the result will be that neighboring nodes attempt to assume different but not reverse phases.

The above computational operations will be explained in further detail with reference to drawings that show how the phases of two or three nodes are forced apart over time.

Figure 2C:
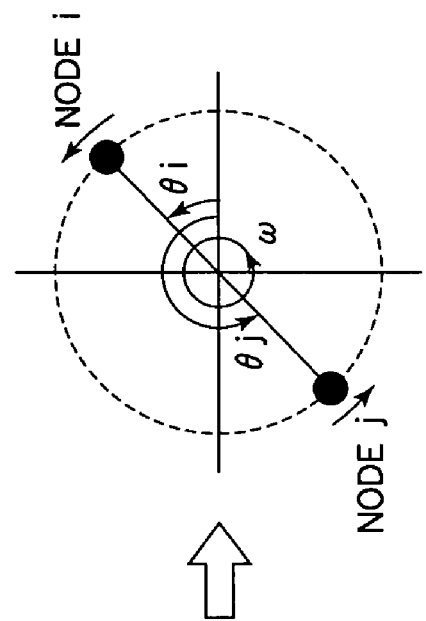
FIG. 2C illustrates the steady state during communication between the two neighboring nodes.
Figure 2B:
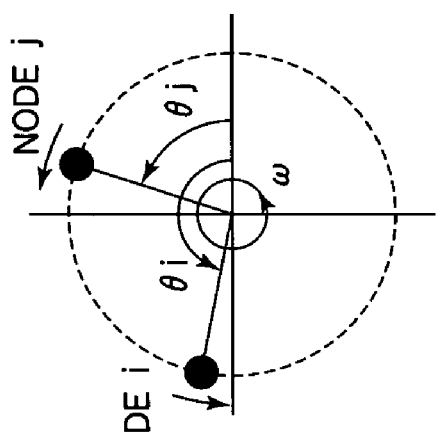
FIG. 2B illustrates a transitional state during communication between the two neighboring nodes.
Figure 2A:
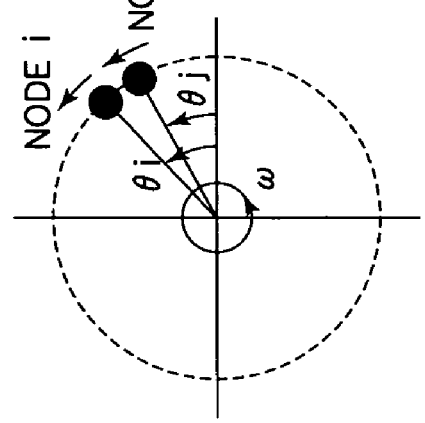
FIG. 2A illustrates an initial state during communication between two neighboring nodes in the first embodiment.

FIGS. 2A, 2B, and 2C illustrate this process when there is just one neighboring node j near the node of interest i. FIG. 2A shows an exemplary initial state, when the system starts operating. Nonlinear oscillation is modeled by the motion of the two point masses rotating around a circle, expressing the timing phase of nodes i and j. If the rotational motion of a point mass is projected onto the vertical axis or horizontal axis, the motion of the projected point exhibits harmonic nonlinear oscillation. From equation (1), a nonlinear characteristic operating on the two mass points attempts to bring them into complementary phases, so with elapse of time the initial state in FIG. 2A passes through a transitional state such as the one in FIG. 2B and finally settles into the steady state shown in FIG. 2C in which the two point masses are substantially π radians out of phase with each other.

The two point masses rotate with a basic angular velocity (equivalent to the basic rate of transitions in the operating states of their nodes) given by the natural angular frequency parameter ω. The point masses interact by transmission and reception of impulse signals, alter (quicken or slow) their angular velocities as a result of the interaction, and reach a steady state in which a complementary phase relationship is maintained. This process can be understood as operating by mutual repulsion of the two point masses as they rotate. In the stable state, if each node transmits an output impulse signal Sout11 at a predetermined phase α (for example, α=0), the transmission timings will have an appropriate temporal relationship.

Figures 3A, 3B, 3C:
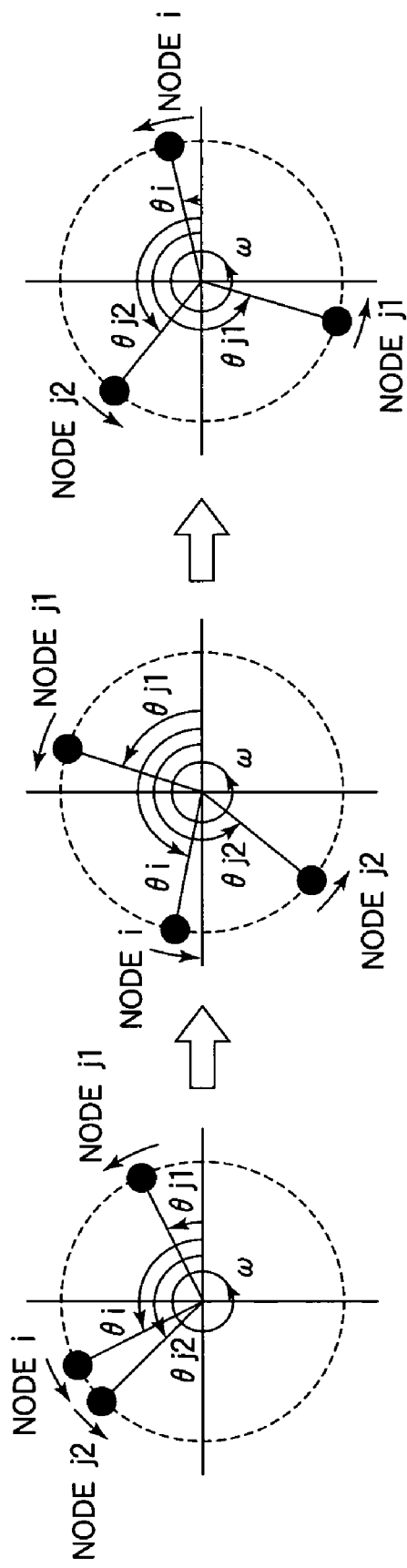
FIG. 3A illustrates an initial state during communication among three neighboring nodes in the first embodiment.
FIG. 3B illustrates a transitional state during communication among the three neighboring nodes.
FIG. 3C illustrates the steady state during communication among the three neighboring nodes.

In FIGS. 3A, 3B, and 3C there are two neighboring nodes j1 and j2 near the node of interest i. FIG. 3A shows an exemplary initial state, FIG. 3B shows a transitional state, and FIG. 3C shows the steady state in which the phases at the three nodes are mutually separated by 2π/3 radians. This state can also be thought of as being reached by mutual repulsion of point masses rotating around a circle. Similar operations occur when the number of neighboring nodes is three or more.

If the number of neighboring nodes changes during the course of system operation, the steady state changes adaptively. Assume, for example, that there is now one node neighboring the node of interest, and that a stable phase relationship has been established as in FIG. 2C. Then assume that one new neighboring node is added. The stability of the phase relationship is destroyed, but after passing through a transitional state, the system assumes a new steady state in which there are two neighboring nodes, as in FIG. 3C. Similar adaptation occurs when two or more new neighboring nodes are added, or when a neighboring node is removed or stops functioning.

The communication timing calculator 12 outputs the phase signal Spr12 or $\theta_i(t)$ that it generates to the impulse signal transmitter 13, steady-state decision unit 14, and data communication unit 15.

The impulse signal transmitter 13 transmits the output impulse signal according to the phase signal Spr12. That is, it transmits the output impulse signal Sout11 when the phase signal Spr12 takes on a specific value α (0≦α≦2π). It is desirable for a single value of α to be set for the entire system. No generality is lost by assuming that α=0, so in the following description it will be assumed that α=0 uniformly throughout the system. In the example shown in FIG. 2C, since there is a phase difference π between the phase signals $\theta_i(t)$ and $\theta_j(t)$ of nodes i and j in the steady state, even if the uniformly set phase value α=0 is used throughout the system, there will be a phase difference π between the transmitting timings of the output impulse signals Sout11 from nodes i and j.

The steady-state decision unit 14 decides whether the transmission timings of the output impulse signals Sout11 at its own node and neighboring nodes are in a transitional state (as in FIGS. 2B and 3B) or a steady state (as in FIGS. 2C and 3C). The steady-state decision unit 14 observes the timing of the received impulse signals (corresponding to the output impulse signals Sout11 of other nodes) and the timing of the output impulse signal from its own node, and decides that they are in the steady state if the timing difference remains temporally constant, or nearly constant. If the transmitting timings of a plurality of nodes that transmit and receive impulse signals to and from each other are stable over time, it decides that the transmitting timing is in the steady state. The steady-state decision unit 14 receives the phase signal Spr12 instead of the output impulse signal Sout11 from its own node, as a signal for acquiring the transmitting timing of the output impulse signal Sout11 from its own node.

The steady-state decision unit 14 can make the steady-state decision, for example, as follows.

(a) The value β of the phase signal Spt12 at the timing of generation of the received impulse signal Spr11 is observed for one period of the phase signal Spr12. Let the observed values β of the phase signal Spr12 be:

$\beta_1, \beta_2, \ldots, \beta_N$ ($0<\beta_1<\beta_2<\ldots<\beta_N<2\pi$)

(b) The differences (phase differences) Δ between adjacent values are calculated from the observed values β of the phase signal Spr12.

$\Delta_1=\beta_1, \Delta_2=\beta_2-\beta_1, \ldots, \Delta_N=\beta_N-\beta_{N-1}$ (c) Processes (a) and (b) above are carried out at intervals of one period of the phase signal Spr12 and the rate of change γ (differences) in the phase difference Δ between adjacent periods are calculated.

$\gamma_1=\Delta_1(\tau+1)-\Delta_1(\tau), \gamma_2=\Delta_2(\tau+1)-\Delta_2(\tau), \ldots, \gamma_N=\Delta_N(\tau+1)-\Delta_N(\tau)$ where τ indicates discrete time in units of one period of the phase signal Spr12.

(d) The steady state is recognized when the above rates of change γ are all smaller than a predetermined value ε.

$\gamma_1<\epsilon, \gamma_2<\epsilon, \ldots, \gamma_N<\epsilon$

It is also possible, however, to make the steady-state decision according to whether the decision condition $\gamma_1<\epsilon, \gamma_2<\epsilon, \ldots, \gamma_N<\epsilon$ is satisfied over M periods (where M is an integer greater than two). The larger the value of M is, the more stable the state must be in order for the steady-state decision unit 14 to decide that the steady state has been reached. Alternatively, the decision may be based on only some of the received impulse signals Spr11.

At intervals equal to the period of the phase signal Spr12, the steady-state decision unit 14 sends the data communication unit 15 a steady-state decision signal Spr13 indicating the decision result, and a slot signal Spr14 equal to the minimum value $\beta_1$ of the value β of the phase signal Spr12. Use of the minimum value $\beta_1$ as a slot signal Spr14 is related to the α=0 assumption made above; if a different value of α is assumed, the applicable value of β also changes.

The node 10 has the functions of relaying data that it has received from other nodes and transmitting data originating at its own node.

The sensor 16, which is shown as an exemplary element for the latter function above, senses physical or chemical environmental information of the node, such as the ambient temperature, sound level, vibration level, seismic magnitude, or concentration of a chemical substance, from the outside world, in the form of an environmental information signal Sin13, and outputs the observation data Spr15 to the data communication unit 15.

The relaying function is performed by the data communication unit 15, which receives an input data signal Sin12 that was transmitted as an output data signal Sout12 by a neighboring node.

The data communication unit 15 transmits the observed data Spr15 or the received data signal Sin12 (or both) as the output data signal Sout12 to other nodes. When the steady-state decision signal Spr13 indicates that the steady state has been recognized, the data communication unit 15 transmits data in a time slot as described below. (The term 'time slot' will be used even though it does not indicate a fixed time interval allocated by the system.) When the steady-state decision signal Spr13 indicates a transitional state, the data communication unit 15 does not transmit data. The output data signal Sout12 and the output impulse signal Sout11 may be transmitted in the same frequency band.

A time slot is a time interval during which the value $\theta_i(t)$ of the phase signal Spr12 satisfies the following condition:

$$\delta_1 < \theta_i(t) < \beta_1 - \delta_2$$

The time slot starts at a timing following the transmission of the output impulse signal Sout12 (the phase signal value at this time is assumed to be $\delta_1$), and ends at a time $\beta_1 - \delta_2$ preceding the generation of the closest received impulse signal, offset by an amount $\delta_2$ from the timing $\beta_1$ of that received impulse signal. The parameters $\delta_1$ and $\delta_2$ are phase widths representing very short spaces of time that assure that impulse signals transmitted from the transmitting node or another neighboring node and data signals transmitted from the transmitting node or another neighboring node are not both present in the space near the transmitting node at the same time. The appropriate values of the parameters $\delta_1$ and $\delta_2$ depend on factors such as the location of the node 10 and may be determined experimentally.

In the steady state shown in FIG. 2C, for example, node i starts transmitting an impulse signal at phase zero ($\theta_i(t)=0$), ends the transmission before phase $\delta_1$, starts transmitting the data signal at phase $\delta_1$ ($\theta_i(t)=\delta_1$), ends the transmission at phase $\beta_1-\delta_2$ ($\beta_1=\pi$), and does not transmit further impulse signals or data signals until the phase value returns to zero. The neighboring node j carries out similar operations in relation to phase $\theta_j$; the phase difference π between $\theta_i$ and $\theta_j$ prevents the transmitted data and impulse signals from colliding. Three or more neighboring nodes can carry out transmission and similarly avoid collisions of transmitted data.

The operations described above assume that the input impulse signal Sin11 received by the impulse signal receiving unit 11 is valid.

Figure 4A:
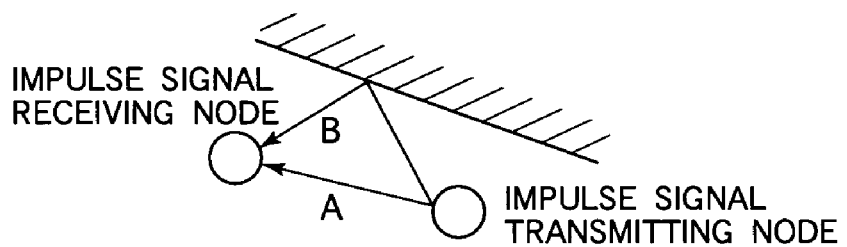
FIGS. 4A and 4B illustrate invalid impulse signals in the first embodiment.
Figure 4B:
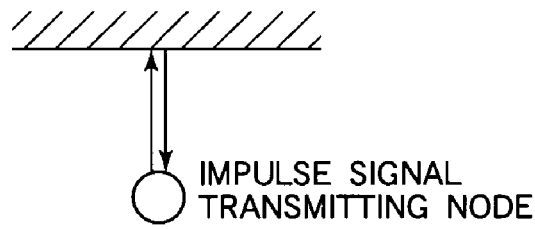

Since there is a possibility that nodes may receive invalid impulse signals, however, the first embodiment provides the validating unit 17. Examples of invalid impulse signals that a node may receive are shown in FIGS. 4A and 4B. FIG. 4A illustrates a valid impulse signal transmitted by a straight communication path A from one node to another node and an invalid impulse signal transmitted to the other node by a communication path B that includes reflection from a surface such as a wall. FIG. 4B illustrates an invalid impulse signal that is transmitted from a node and returns directly to the same node by reflection from a wall.

The validating unit 17 detects invalid input impulse signals due to reflection (reflected impulse signals) from the phase differences between the input impulse signals received by the node or the phase differences between input and output impulse signals received and transmitted by the node.

As described with reference to FIGS. 2A to 2C and 3A to 3C, each node autonomously and interactively alters the timing phase of the output impulse signals it transmits until it settles into a steady state in which this timing phase has a predetermined relationship to the timing phases of other nodes, and the phase differences between the impulse signals transmitted and received by the node have constant values. While the node is in a transitional state before the steady state is reached, these phase differences do not remain fixed at constant values.

If the nodes are stationary, however, then even if the transmission timing of the impulse signals from a node varies, invalid impulse signals reflected from walls or the like will maintain a constant timing relationship with valid impulse signals transmitted from the same node. In FIG. 4A, for example, since the difference in length between the normal path A and the irregular path B is constant, the phase difference between impulse signals transmitted on these two paths will be constant. Reflected impulse signals arriving on path B can be identified by the use of this characteristic.

In FIG. 4B, since the reflected path has a constant length, there is a fixed phase difference between the timing with which an impulse signal is transmitted from the node and the timing with which the reflected impulse signal is received at the same node. The reflected impulse signal can be identified by the use of this characteristic.

In addition to the input impulse signal Sin11, accordingly the validating unit 17 receives a timing signal from the impulse signal transmitter 13 indicating the timing at which the node transmits an output impulse signal Sout11. The timing signal may simply be a copy of the output impulse signal itself; alternatively, a separate timing signal may be generated.

The validating unit 17 detects constant intervals between timing signals, where the timing signals include the input impulse signals Sin11 received from the impulse signal receiving unit 11 and the timing signals representing the timing of the output impulse signal Sout11, received from the impulse signal transmitter 13. For example, the validating unit 17 may measure the interval between each timing signal received and the next timing signal received, calculate statistical data from the measured differences, distinguish between differences that recur with higher probability and differences that recur with low probability, and thereby recognize invalid input impulse signals Sin11. As noted above, the impulse signal receiving unit 11 discards an input impulse signal Sin11 that has been recognized as invalid.

Figure 5:
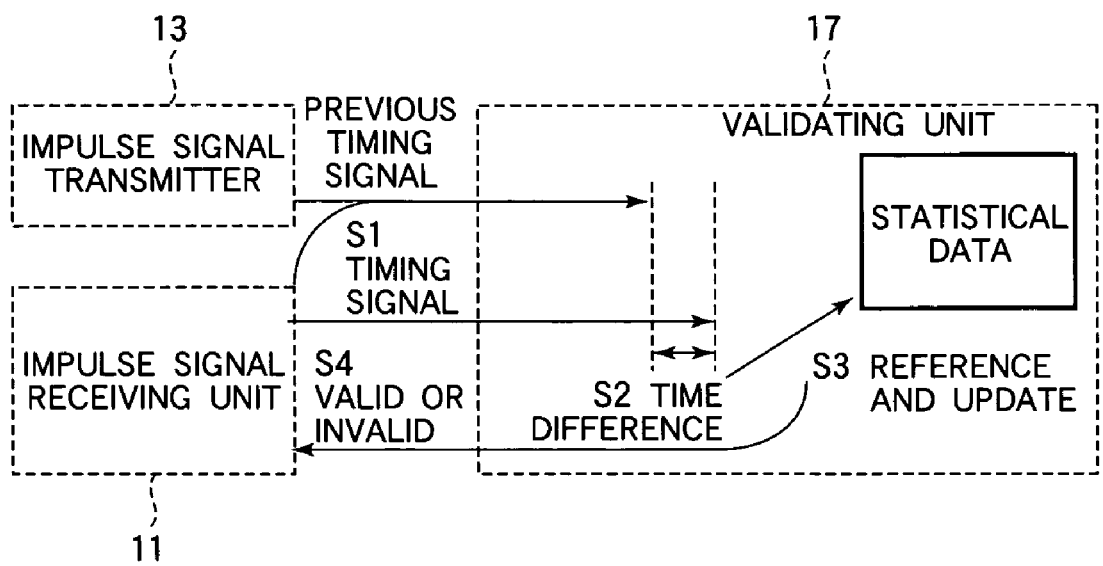
FIG. 5 illustrates the flow of operations involving the validating unit at a node in the first embodiment.

The validating unit 17 may operate, for example, as illustrated in FIG. 5. The previous timing signal in FIG. 5 is the most recent timing signal received from the impulse signal transmitter 13 or the impulse signal receiving unit 11.

When the validating unit 17 receives a new timing signal from the impulse signal receiving unit 11 (step S1), it stores the time of arrival of the new timing signal and measures the time interval from the previous timing signal to the new timing signal (step S2). (If the new timing signal is received from the impulse signal transmitter 13, the validating unit 17 stores its time of arrival but does not measure the interval from the previous timing signal.)

The validating unit 17 then consults its statistical data to see whether or not the measured interval occurs with high probability, and updates the statistical data to include the new measurement (step S3).

If the measured time interval occurs with high probability, the validating unit 17 decides that the new timing signal is an invalid signal due to reflection from a wall or the like, and sends a result indicating that the timing signal is invalid to the impulse signal receiving unit 11; otherwise, it sends a result indicating that the timing signal is valid.

The first embodiment provides the following effects.

Unlike the TDMA method, in which an administrative node assigns time slots to other nodes, the first embodiment has no administrative node; instead, each node interacts with its neighboring nodes and assigns its own time slots autonomously. The individual nodes also adjust the timing of their time slots autonomously. Accordingly, the first embodiment is robust in that its communication capabilities cannot be lost by the failure of a single administrative node, or any other single node or group of nodes.

Furthermore, if the system configuration is partially changed by addition or removal of nodes, or because a node fails or is moved to a new location, the first embodiment makes it possible for the nodes affected by the change to autonomously and adaptively reassign their time slots, while other nodes not affected by the change to continue data communication without interruption for alteration of time slots.

Since the autonomous mutual adjustment of the time slots takes place among neighboring nodes, nodes that are so distant from each other that their transmitted signals do not interfere can transmit data simultaneously. In other words, nodes in different locations can transmit data in overlapping time slots as long as the time slots of neighboring nodes do not overlap, so that signal collisions do not occur.

Implementing this type of operation by centralized control at an administrative node would force the administrative node to keep track of the spatial positional relationships of all nodes and their carrier signal propagation ranges. In a system in which nodes move or are added to or removed from the network frequently, the complexity and computational cost of these operations would be high, much additional communication overhead would be necessary, and communication efficiency would suffer accordingly.

The first embodiment accordingly provides for efficient data communication, adaptive to changes of the system structure or layout. Moreover, even if the number of nodes generating traffic increases, increases in overhead are limited, and communication efficiency is maintained.

The first embodiment also allows a mode of operation in which only nodes that generate traffic transmit output impulse signals Sout11; in this case, even if the group of nodes generating traffic changes over time, whenever such a change occurs, the time slots can be effectively reassigned, thereby enabling efficient data communication by the group of nodes generating traffic.

Furthermore, the first embodiment enables invalid impulse signals reflected by walls or other obstacles to be detected, thereby preventing these signals from interfering with communication timing control. The desired steady state can therefore be reached quickly and maintained even in the presence of signal reflection.

Second Embodiment

In the first embodiment, detection of invalid impulse signals is contingent on the nodes remaining generally stationary. The second embodiment enables invalid impulse signals to be identified even if some or all of the nodes move. In the second embodiment each node counts the number of impulse signals that have been transmitted by the node itself and all its neighboring nodes and adds the current count value (referred to as count information) to the next impulse signal it generates and transmits.

Figure 6:
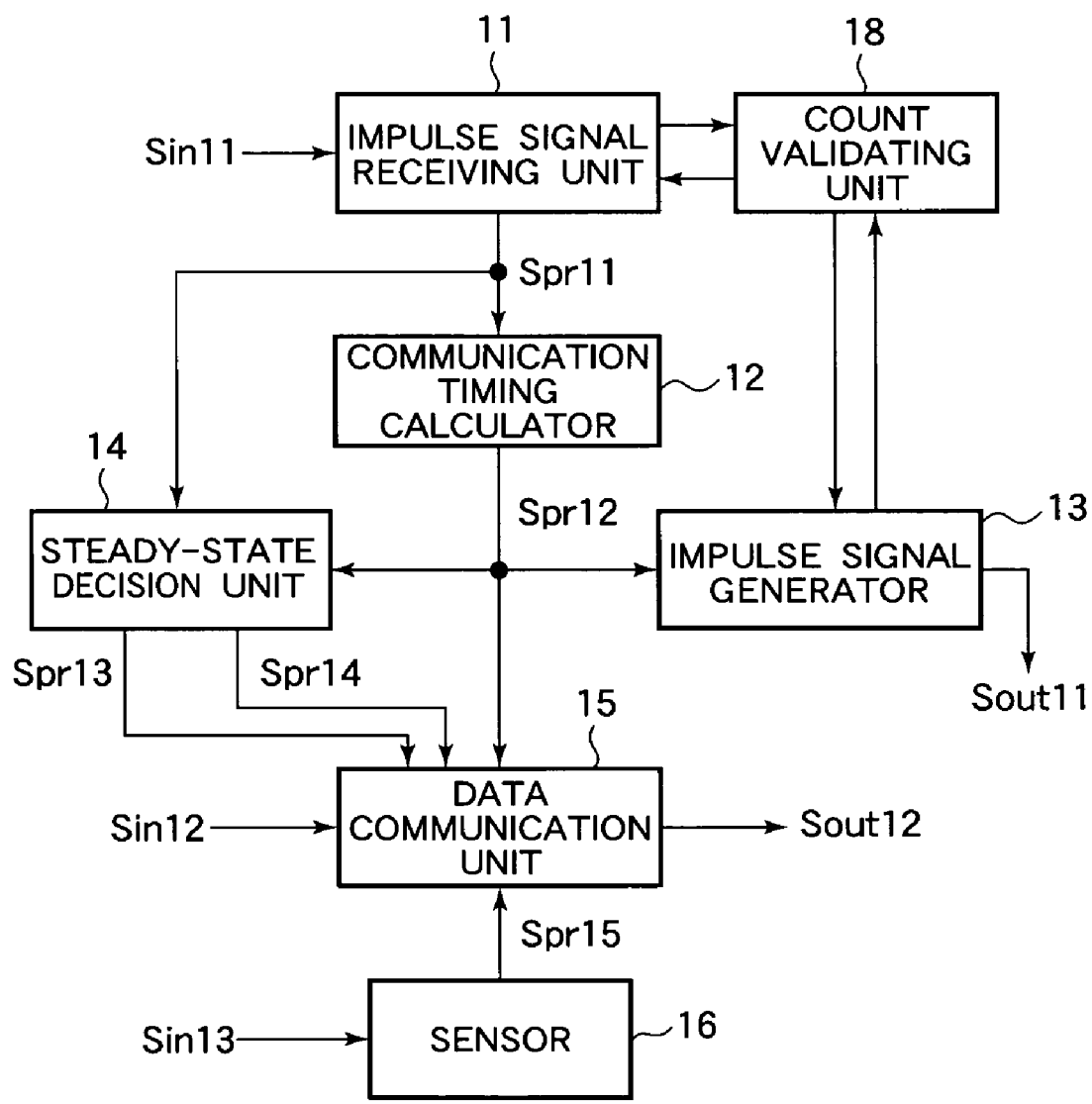
FIG. 6 is a block diagram showing the internal functional structure of a node according to a second embodiment of the invention.

Referring to FIG. 6, in a node 10A in the second embodiment, the validating unit in the first embodiment is replaced by a count validating unit 18, and the functions of the impulse signal receiving unit 11 and the impulse signal transmitter 13 are slightly altered. The other constituent elements are the same as in the first embodiment, so descriptions will be omitted.

In the second embodiment, as in the first embodiment, the impulse signal receiving unit 11 receives an output impulse signal transmitted by a neighboring node as an input impulse signal Sin11, but the input impulse signal Sin11 includes count information, which the impulse signal receiving unit 11 extracts.

Count information is added to an impulse signal by the impulse signal transmitter 13 as described later; some exemplary methods of adding and extracting count information are as follows.

In the first exemplary method, the waveform of a count information signal is superimposed on the Gaussian or other waveform of the impulse signal, and the count information is extracted by a filter that passes a specific frequency component.

In the second exemplary method, the impulse signal has a square waveform with a finite width expressing the count information. The receiving node measures the pulse width of the square impulse signal waveform by using an internally generated clock, for example, thereby extracting the count information.

In the third exemplary method, the impulse signal has a header identifying the signal as an impulse signal, followed by the waveform of the count information signal. The node that receives the impulse signal detects the header information and extracts the added count information.

The impulse signal receiving unit 11 supplies the count information extracted from the input impulse signal Sin11 to the count validating unit 18 and requests a decision. The count validating unit 18 returns a decision result indicating whether or not the input impulse signal is valid. The processing after receipt of the decision result is the same as in the first embodiment.

If the impulse signal receiving unit 11 fails to extract count information from an input impulse signal Sin11, it discards the input impulse signal as an invalid signal without requesting a decision by the count validating unit 18. This type of event may occur when an impulse signal is distorted by noise, for example, or when a noise waveform accidentally mimics an impulse signal.

The count validating unit 18 decides whether or not an impulse signal is valid by comparing its count information with the count information of the preceding impulse signal, and retains the count information of the impulse signal for comparison with the next impulse signal. The decision method used by the count validating unit 18 will be described later. If the decision result indicates that the impulse signal is valid, the count validating unit 18 increments the count information it retains by one.

The count validating unit 18 may also receive a request for count information from the impulse signal transmitter 13. The count validating unit 18 responds to this request by incrementing the count information it currently retains by one, thereby updating its count information, and returning the updated count information to the impulse signal transmitter 13.

The maximum count value that can be internally retained by the count validating unit 18 is predetermined. When the maximum value is incremented, it is reset to a predetermined minimum value. When there is a great difference between the two count values compared with each other, the larger value being near the maximum value and the smaller value being near the minimum value, it is assumed that a cyclic reset has occurred, the difference between the minimum and maximum values is added to the smaller value, and the comparison is repeated.

The impulse signal transmitter 13 in the second embodiment sends a message requesting count information to the count validating unit 18 when the phase signal received from the communication timing calculator 12 takes on a specific value $\alpha$ (e.g., $\alpha=0$). When the requested count information is returned, the impulse signal transmitter 13 generates and transmits an output impulse signal Sout11 including the count information.

Figure 7:
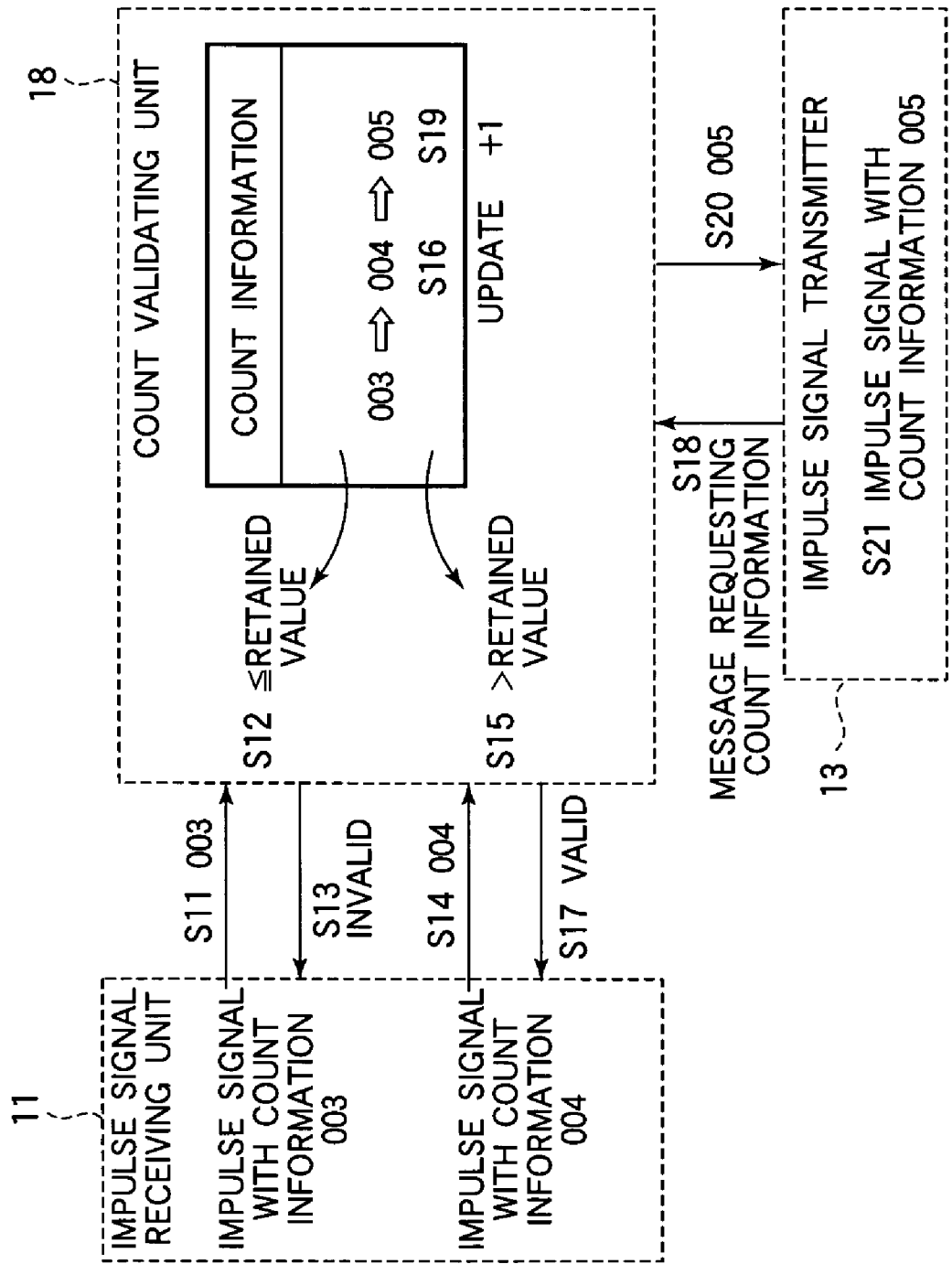
FIG. 7 illustrates the flow of operations involving the count validating unit at a node in the second embodiment.

The decision operation of the count validating unit 18 and other count information-related operations will now be described with reference to FIGS. 4A and 4B and FIG. 7.

When a reflected impulse signal is input to a node, the count information added to the reflected impulse signal will either have already been received in another (non-reflected) impulse signal (the case shown in FIG. 4A), or already have been transmitted in an impulse signal transmitted from the node itself (the case shown in FIG. 4B). In either case, the count value received with the reflected impulse signal will be equal to or less than the count value currently retained by the count validating unit 18.

When the count validating unit 18 receives the extracted count information from the impulse signal receiving unit 11 (steps S11 and S14 in FIG. 7), it therefore determines whether or not the value of the count information is equal to or less than the retained count value (steps S12 and S15).

If the extracted count value is equal to or less than the retained count value (e.g., both the retained count value and the extracted count value are 3), the input impulse signal Sin11 is a reflected counterpart of the preceding transmitted or received impulse signal, and accordingly the count validating unit 18 returns a decision result of 'invalid' to the impulse signal receiving unit 11 (step S13).

If the extracted count information is greater than the retained count value (e.g., the retained count value is 3 and the extracted count value is 4), the input impulse signal Sin11 is a new input impulse signal, not yet transmitted or received. The count validating unit 18 updates the retained count value to the new count value (step S16, in which the retained count value of 3 is replaced by the newly received count value of 4) and returns a decision result of 'valid' to the impulse signal receiving unit 11 (step S17).

Each time a valid impulse signal is received, the communication timing calculator 12 recalculates the function that generates the phase signal as described in the first embodiment. After a sufficient number of valid input impulse signals have been received at regularly related timings, the steady-state decision unit 14 recognizes the steady state, and the impulse signal transmitter 13 begins transmitting output impulse signals at the timings indicated by the phase signal.

At each of these timings, the impulse signal transmitter 13 sends a count information request message to the count validating unit 18 (step S18). The count validating unit 18 increments its retained count information (step S19, in which the retained count value of 4 is incremented to 5), and returns the updated count information to the impulse signal transmitter 13 (step S20). The impulse signal transmitter 13 then transmits an output impulse signal Sout11 with the count information attached (step S21).

In addition to the effects provided by the first embodiment, the second embodiment provides following effects.

In the second embodiment, a node can identify invalid received impulse signals by storing and updating a single count value (requiring only a small amount of memory space) and performing a simple comparison operation. Since there is no need to accumulate statistical data, invalid impulse signals can be recognized quickly. Moreover, since the detection of invalid impulse signals is not contingent on fixed arrival intervals between impulse signals and their reflections, invalid impulse signals can be detected even if the transmitting or receiving node is moving. The second embodiment is therefore applicable to communication systems with moving nodes as well as communication systems in which all nodes remain stationary.

In the description above, the input impulse signal is recognized as valid whenever the extracted count value is greater than the retained count value, regardless of the size of the difference between the two values. In a variation of the second embodiment, the input impulse signal is recognized as valid only if the extracted count value is larger than the retained count value by one. This variation reduces the likelihood that a reflected impulse signal will be mistakenly recognized as valid if its count information is distorted by the reflection, but increases the likelihood that a valid impulse signal will be mistakenly recognized as invalid because the count values of successive impulse signals are out of order. Count order reversals may occur for a variety of reasons, including transient conditions and the positional relationships among three or more interacting nodes.

Third Embodiment

The count information added to each impulse signal in the second embodiment can be regarded as a type of identifying (ID) information that varies regularly from one impulse signal to the next. The third embodiment also adds ID information to the impulse signals, but varies the ID information irregularly.

In the third embodiment, each node generates random ID information to add to the output impulse signals it transmits. A node receiving an impulse signal extracts the ID information and decides whether or not the input impulse signal is valid by comparing the extracted ID information with internally retained ID information. If the input impulse signal is valid, the node retains the extracted ID information for a predetermined period of time.

Figure 8:
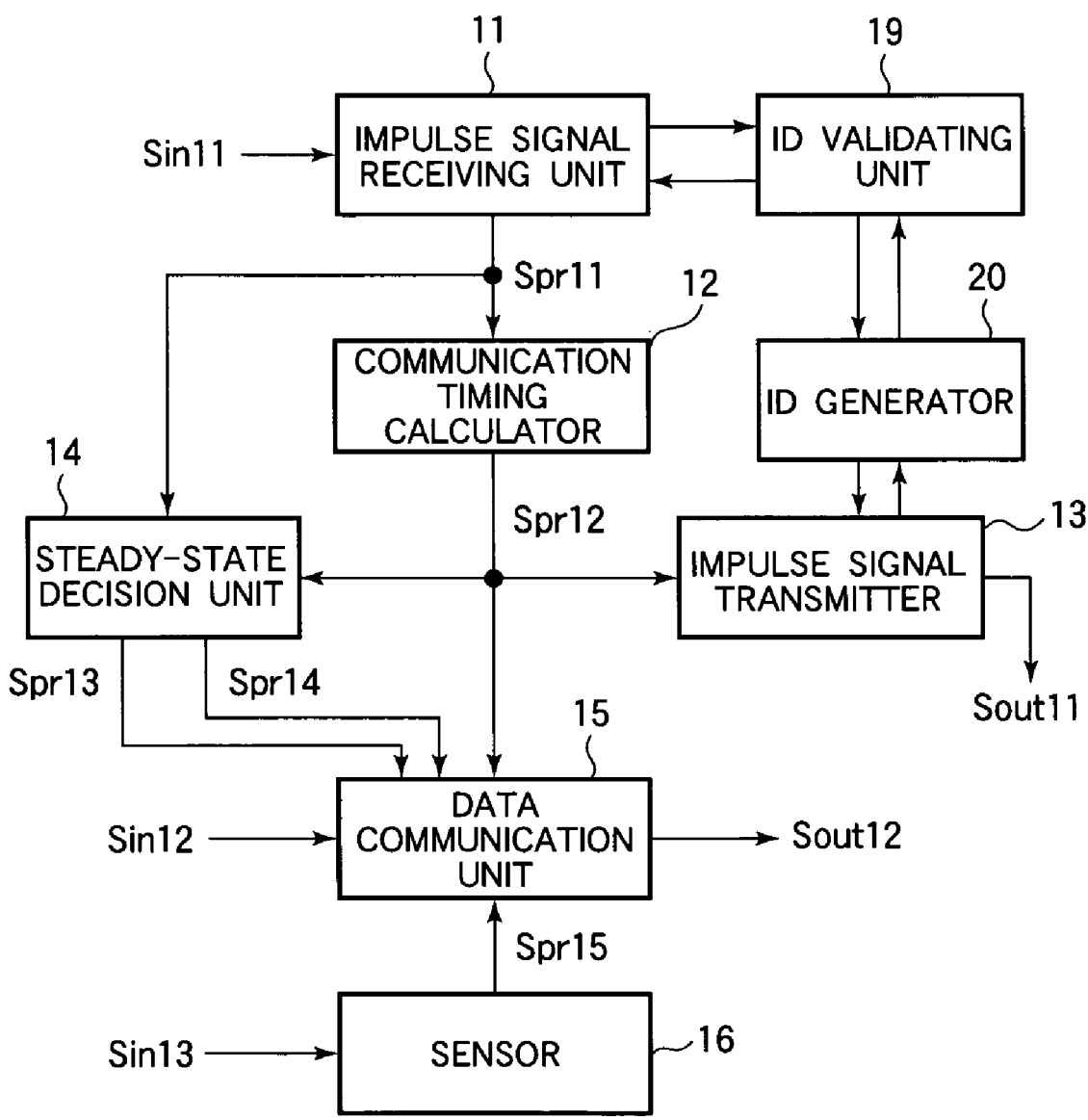
FIG. 8 is a block diagram showing the internal functional structure of a node according to a third embodiment and a sixth embodiment of the invention.

Referring to FIG. 8, in a node 10B in the second embodiment the count validating unit in the second embodiment is replaced by an ID validating unit 19 and an ID generator 20, and the functions of the impulse signal receiving unit 11 and impulse signal transmitter 13 are slightly altered. Other constituent elements are the same as in the second embodiment, so descriptions will be omitted.

The impulse signal receiving unit 11 in the third embodiment is the same as in the second embodiment, except that ID information instead of count information is extracted from each input impulse signal Sin11.

The impulse signal transmitter 13 in the third embodiment is the same as in the second embodiment, except that the impulse signal transmitter 13 requests ID information from the ID generator 20, and adds the ID information received from the ID generator 20 to each output impulse signal Sout11.

The ID validating unit 19 receives ID information from the impulse signal receiving unit 11, decides whether or not the impulse signal from which the ID information was extracted is valid as described below, and returns the decision result to the impulse signal receiving unit 11. The ID validating unit 19 retains ID information extracted from valid impulse signals for a predetermined period of time. The ID validating unit 19 also receives ID information from the ID generator 20, and compares this ID information with the ID information it already retains. If the ID information received from the ID generator 20 differs from all of the ID information currently retained, the ID validating unit 19 retains the new ID information, which will be added to an output impulse signal transmitted from the node, for the same predetermined period of time. If the ID information received from the ID generator 20 is already present in the retained ID information, the ID validating unit 19 sends an ID information update request message to the ID generator 20, to have new ID information generated.

The retention time may be predetermined by the system, or may be determined from the angular frequency or phase value of the phase signal output by the communication timing calculator 12, from the memory capacity allocated for storing IDs and other information, or from the capacity remaining at the time in the node. In one scheme, the ID validating unit 19 uses a number of storage areas cyclically to store the ID information, new ID information being overwritten on the oldest previous ID information.

The ID generator 20 generates and stores ID information to be added to output impulse signals Sout11 transmitted from the node. The ID generator 20 may include a random number generator, for example, and use a random number generated thereby as ID information. When the ID generator 20 receives an ID information request message from the impulse signal transmitter 13, it sends the stored ID information to the ID validating unit 19 and impulse signal transmitter 13. If the ID generator 20 receives an ID information update message in immediate reply from the ID validating unit 19, it generates new ID information, and sends the new ID information to impulse signal transmitter 13 and the ID validating unit 19.

The ID generator 20 generates ID information at the start of communication, for example, and whenever it receives an ID information update request from the ID validating unit 19. Alternatively, the ID generator 20 may generate and store a plurality of ID information at the start of communication, and output one of the stored items of ID information in response to each ID information request messages from the impulse signal transmitter 13. If the ID validating unit 19 returns an ID information update request message, the ID generator 20 selects a different item of stored ID information and sends it to the impulse signal transmitter 13 and ID validating unit 19, or generates new ID information and sends it to the impulse signal transmitter 13 and ID validating unit 19. Alternatively, the ID validating unit 19 may store the same plurality of ID information as the ID generator 20 and notify the ID validating unit 19 when an item of ID information received from the impulse signal receiving unit 11 matches the next item of ID information that the ID validating unit 19 will send to the impulse signal transmitter 13, instructing the ID validating unit 19 to skip that item of ID information, or to replace it with newly generated ID information.

The ID validating unit 19 can manage a plurality of ID information in various ways. For example, the ID validating unit 19 may use its stored ID information cyclically, or may use each stored ID continuously until it receives an ID information update request, and generate new ID information when the stored ID information runs out.

Next, exemplary operations of the ID validating unit 19 and ID generator 20 will be described with reference to FIG. 9. The illustrated operations start from a state in which the ID validating unit 19 retains only ID information 'xxx'.

When the 19 receives from the impulse signal receiving unit 11 ID information that has been extracted from an input impulse signal (steps S31 and S34), it determines whether or not the extracted ID information matches any retained ID information (steps S32 and S35).

If the extracted ID information matches any retained ID information, the ID validating unit 19 informs the impulse signal receiving unit 11 that the input impulse signal is invalid (step S33). In the example illustrated, extracted ID information 'xxx' is invalid.

If the extracted ID information does not match any retained ID information, the ID validating unit 19 adds the ID information to its internally retained ID information (step S36), and informs the impulse signal receiving unit 11 that the input impulse signal is valid (step S37). In the example illustrated, extracted ID information 'yyy' is valid. The impulse signal receiving unit 11 then sends the received impulse signal to the communication timing calculator 12, which adjusts the phase signal, and the steady-state decision unit 14, which decides whether the steady state has been reached.

At the predetermined phase α in the steady state, the impulse signal transmitter 13 sends an ID information request message to the ID generator 20 (step S38). The ID generator 20 then generates ID information, or selects an item of pre-stored ID information, and sends the ID information to the impulse signal transmitter 13 and ID validating unit 19 (step S39). In the present example, this ID information ('zzz') does not match any of the ID information ('xxx' and 'yyy') retained in the ID validating unit 19, so the ID validating unit 19 adds the received ID information ('zzz') to its retained ID information (step S40). The ID validating unit 19 deletes each item of retained ID information when its retention time expires (step S41).

Figure 9:
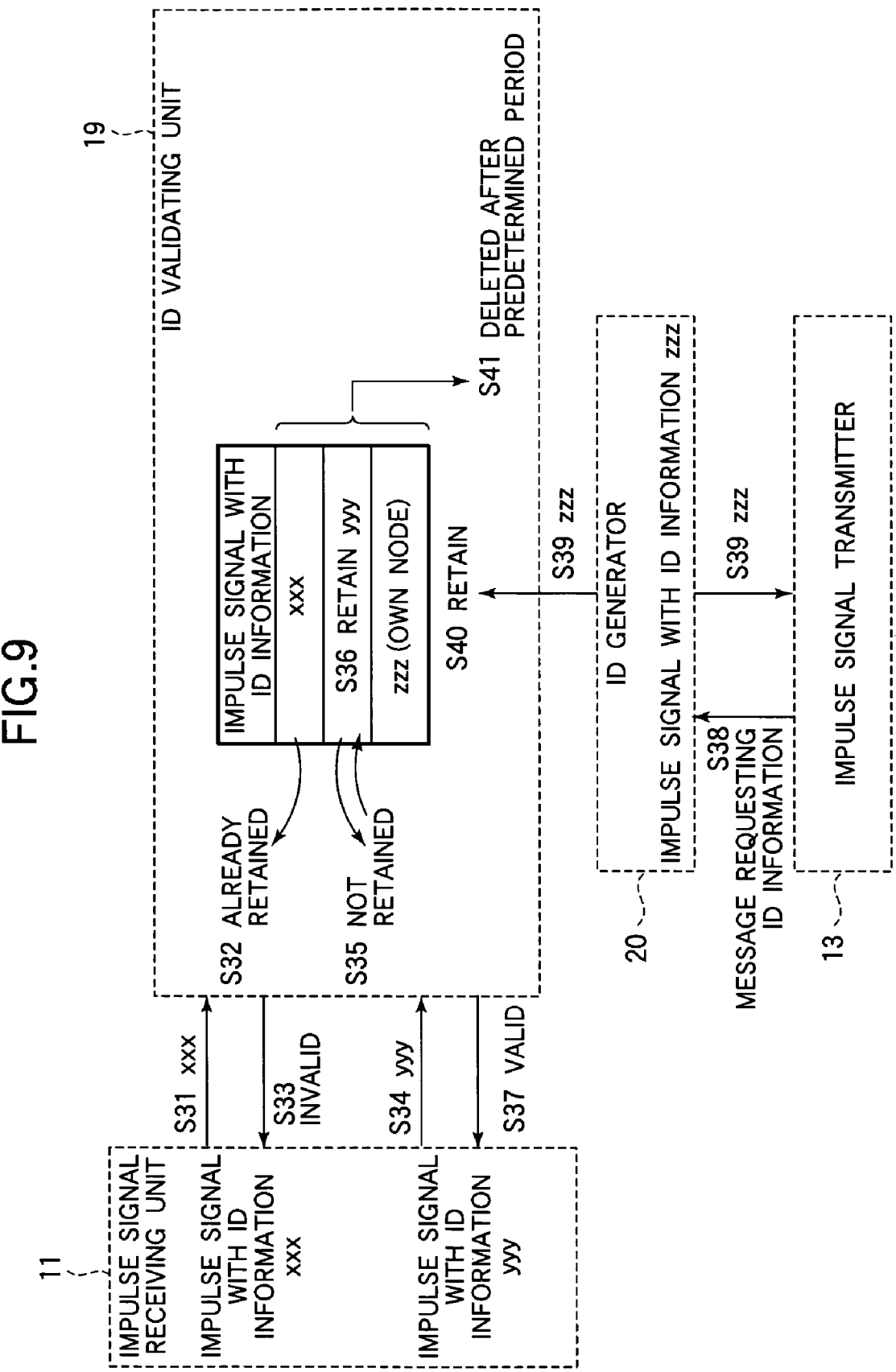
FIG. 9 illustrates the flow of operations involving the ID validating unit at a node in the third embodiment.

Although not shown in FIG. 9, the impulse signal transmitter 13 adds the ID information ('zzz') to an output impulse signal and transmits the output impulse signal. If this ID information ('zzz') had matched either item of ID information retained in the ID validating unit 19 ('xxx' or 'yyy'), the ID generator 20 would send the impulse signal transmitter 13 and ID validating unit 19 new ID information (not shown) to replace the matching ID information ('zzz').

Although the third embodiment uses random ID information instead of count information, it produces the same effects as the second embodiment, without needing to increment a count each time an output signal is transmitted. Since the retention time of ID information is limited, it is not necessary to change the ID information added to the impulse signals transmitted by a node unless matching ID information is received from another node.

Fourth Embodiment

Figure 10:
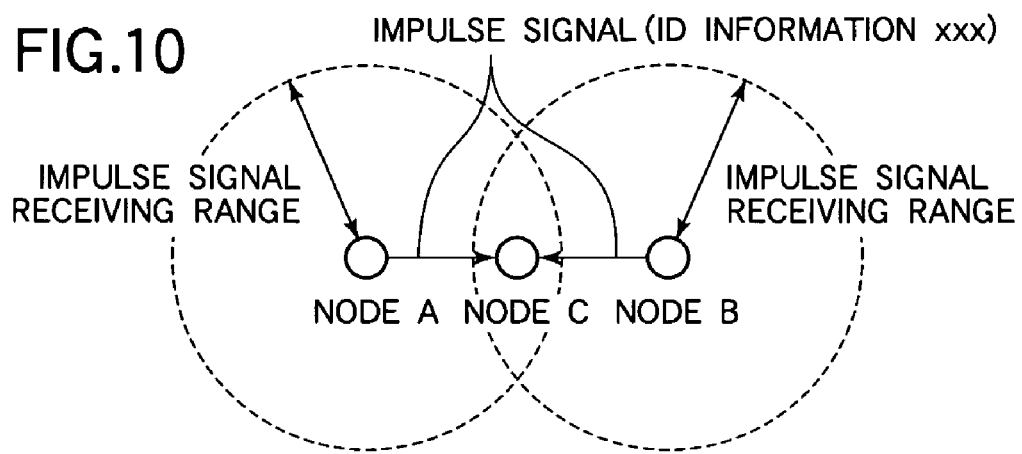
FIG. 10 illustrates the necessity of the fourth embodiment of the invention.

The fourth embodiment addresses certain situations that may arise in the third embodiment. For example, when there is a node C within communication range of nodes A and B, which are out of communication range with each other, as shown in FIG. 10, if nodes A and B transmit impulse signals with the same ID information to node C, node C will decide that the impulse signal received later is invalid.

The fourth embodiment deals with this situation by having node C transmit a message to nodes A and B to inform them that they are using the same ID information, a fact that they cannot learn directly because they cannot receives each other's impulse signals. Node A, node B, or both nodes can then modify their ID information, so that they do not continue generating impulse signals with the same ID information.

Figure 11:
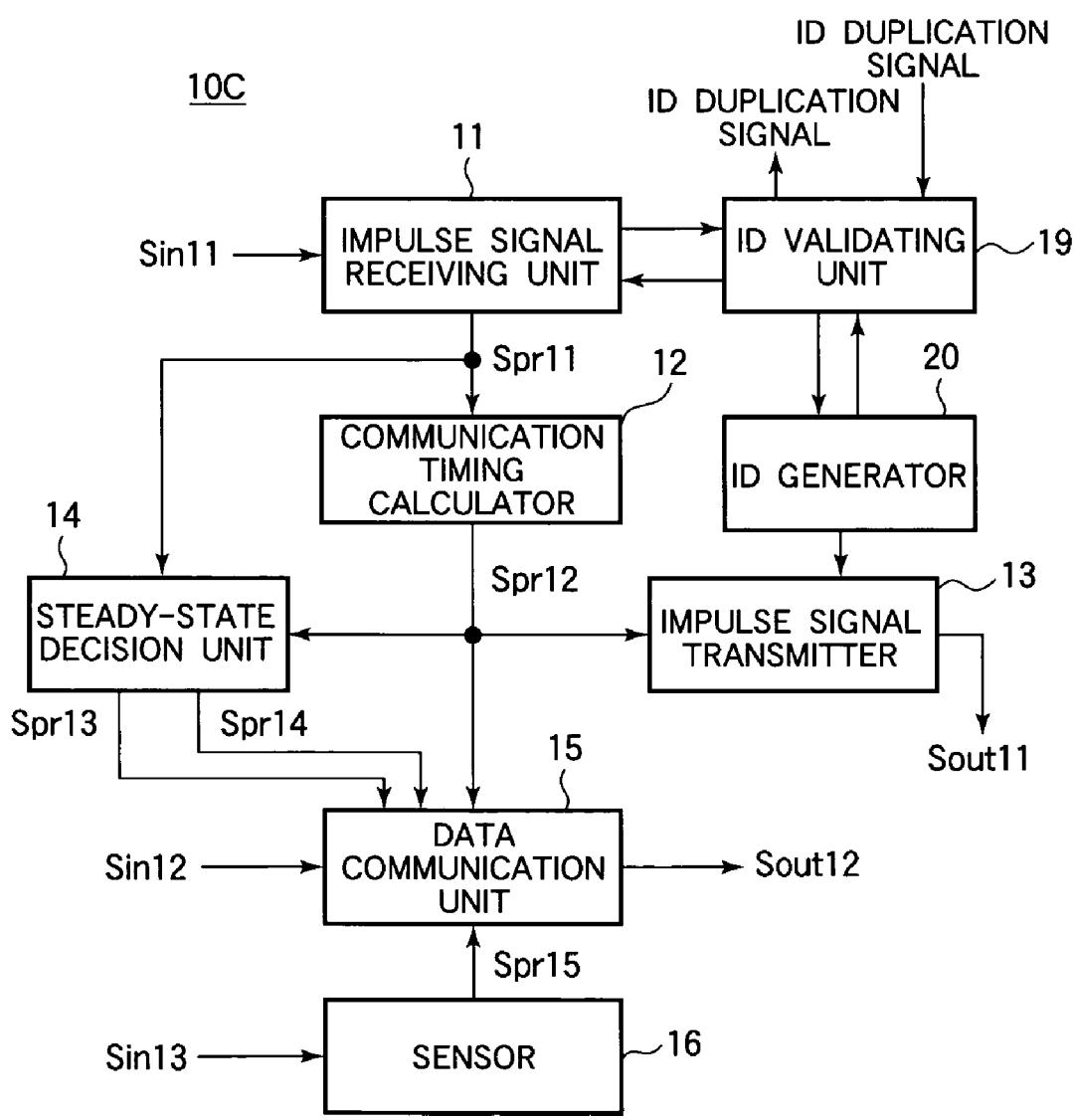
FIG. 11 is a block diagram showing the internal functional structure of a node according to the fourth embodiment.

Referring to FIG. 11, a node 10C in the fourth embodiment has the same constituent elements as in the third embodiment, but the functions of the ID validating unit 19 differ from its functions in the third embodiment. The differences will be described below.

The ID validating unit 19 in the fourth embodiment transmits an ID duplication signal (without destination information, for example) to its neighboring nodes under a given condition, and also receives ID duplication signals from its neighboring nodes. The ID duplication signals are transmitted and received by using a carrier frequency or modulation system different from the one used for the output impulse signal and output data signal. The ID duplication signal is output when it is evident that a plurality of neighboring nodes are generating the same ID information, and includes a copy of that ID information. Before output of an ID duplication signal, the ID validating unit 19 checks whether it currently retains an identical ID duplication signal; if it currently retains an identical ID duplication signal, it does not output the ID duplication signal.

After outputting the ID duplication signal, the ID validating unit 19 retains the ID duplication signal for a predetermined period of time. The retention time may be uniformly predetermined by the system, may be set in accordance with the angular frequency or phase value of the phase signal output from the communication timing calculator 12, or may be set in accordance with the memory capacity in the node.

As in the third embodiment, the ID validating unit 19 retains valid ID information that has been extracted from an input impulse signal Sin11 and ID information that has been generated by the ID generator 20 and transmitted in an output impulse signal for a predetermined period of time, but the predetermined period of time is now divided into a valid period followed by an invalid period. During the valid period, if the ID validating unit 19 receives the same ID information as the retained ID information from the impulse signal receiving unit 11, it returns a decision result of 'invalid' to the impulse signal receiving unit 11; during the invalid period, if the ID validating unit 19 receives the same ID information as the retained ID information from the impulse signal receiving unit 11, it returns a decision result of 'invalid' to the impulse signal receiving unit 11 and outputs an ID duplication signal.

When the ID validating unit 19 receives an ID duplication signal from a neighboring node, if the ID information added to the signal is identical to the ID information the ID validating unit 19 has most recently received from the ID generator 20, the ID validating unit 19 requests new ID information from the ID generator 20 and also has the ID generator 20 send the new ID information to the impulse signal transmitter 13. If the ID information added to the ID duplication signal is different from the ID information most recently received from the ID generator 20, the ID validating unit 19 retains the ID duplication signal received from the neighboring node for a predetermined period of time.

Figure 12:
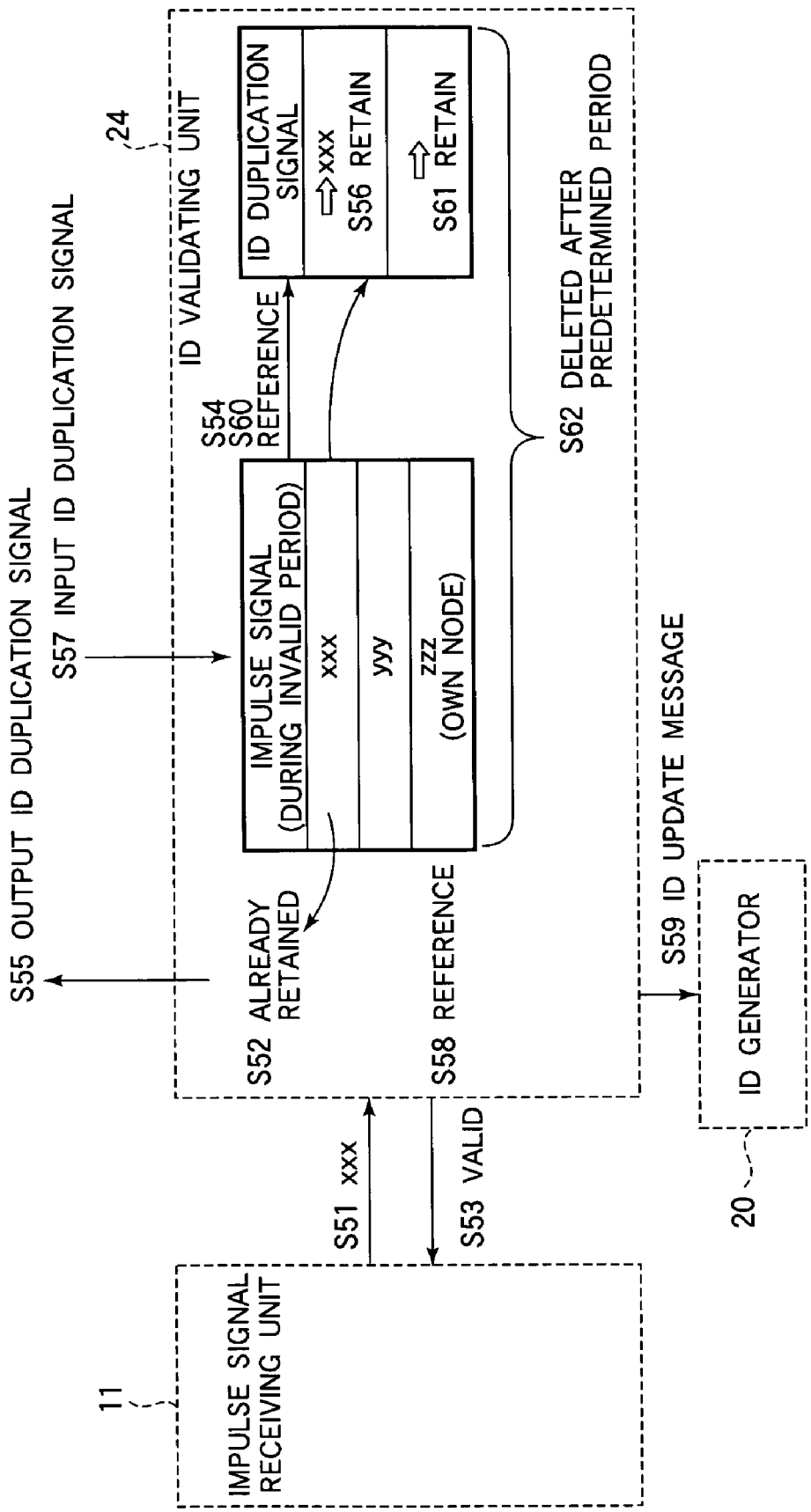
FIG. 12 illustrates the flow of operations involving the ID validating unit at a node in the fourth embodiment.

The operation of the ID validating unit 19 in the fourth embodiment will be described below with reference to FIGS. 11 and 12. When the ID information extracted from an input impulse signal Sin11 is identical to ID information retained in the ID validating unit 19, if the retained ID information is still in its valid period, the ID validating unit 19 operates as in the third embodiment; if the retained ID information is in its invalid period, the ID validating unit 19 operates as follows.

When the ID validating unit 19 receives ID information (e.g., 'xxx') extracted from an input impulse signal (step S51), if the ID information matches ID information that is currently in the invalid period of its retention time (step S52), the ID validating unit 19 returns a decision result to the impulse signal receiving unit 11 indicating that the input impulse signal is valid (step S53), the assumption being that the retained identical ID information was received from a different neighboring node. Next, the ID validating unit 19 decides whether or not it currently retains an ID duplication signal with the ID information added (step S54).

If the ID validating unit 19 does not retain an ID duplication signal with the same ID information added, it outputs such an ID duplication signal itself (step S55) and retains the output ID duplication signal (step S56). If the ID validating unit 19 already retains an ID duplication signal with the ID information added, it does not either output or retain a new ID duplication signal.

When the ID validating unit 19 receives an ID duplication signal output by a neighboring node (step S57), it compares the ID information added to the ID duplication signal with the ID information that the impulse signal transmitter 13 added to the most recently transmitted output impulse signal, or will add to the next output impulse signal (step S58). If the two items of ID information match, the ID validating unit 19 sends an ID information update request message to the ID generator 20 to have it generate new ID information (step S59). If the two items of ID information do not match, the ID validating unit 19 checks whether or not the ID information added to the received ID duplication signal matches the ID information of any ID duplication signal currently retained (step S60). If the ID validating unit 19 does not currently retain an ID duplication signal with the same the ID information as added to the received ID duplication signal, it retains the ID duplication signal that it received (step S61).

The ID validating unit 19 deletes retained ID information and ID duplication signals when their predetermined retention time expires (step S62).

In the fourth embodiment, apart from the effects produced by the third embodiment, a node that receives impulse signals with the same ID information from different neighboring nodes makes the different nodes aware that they are generating the same ID information. The nodes respond by generating new ID information, enabling valid impulse signals to be distinguished from invalid impulse signals more accurately than in the third embodiment.

Fifth Embodiment

Like the third and fourth embodiments, the fifth embodiment adds ID information to the output impulse signals, but whereas the ID information was generated randomly in the third and fourth embodiments, the fifth embodiment gives each node a unique node identifier (ID) and adds the node ID to the output impulse signal. This scheme avoids the problem addressed by the fourth embodiment.

Figure 13:
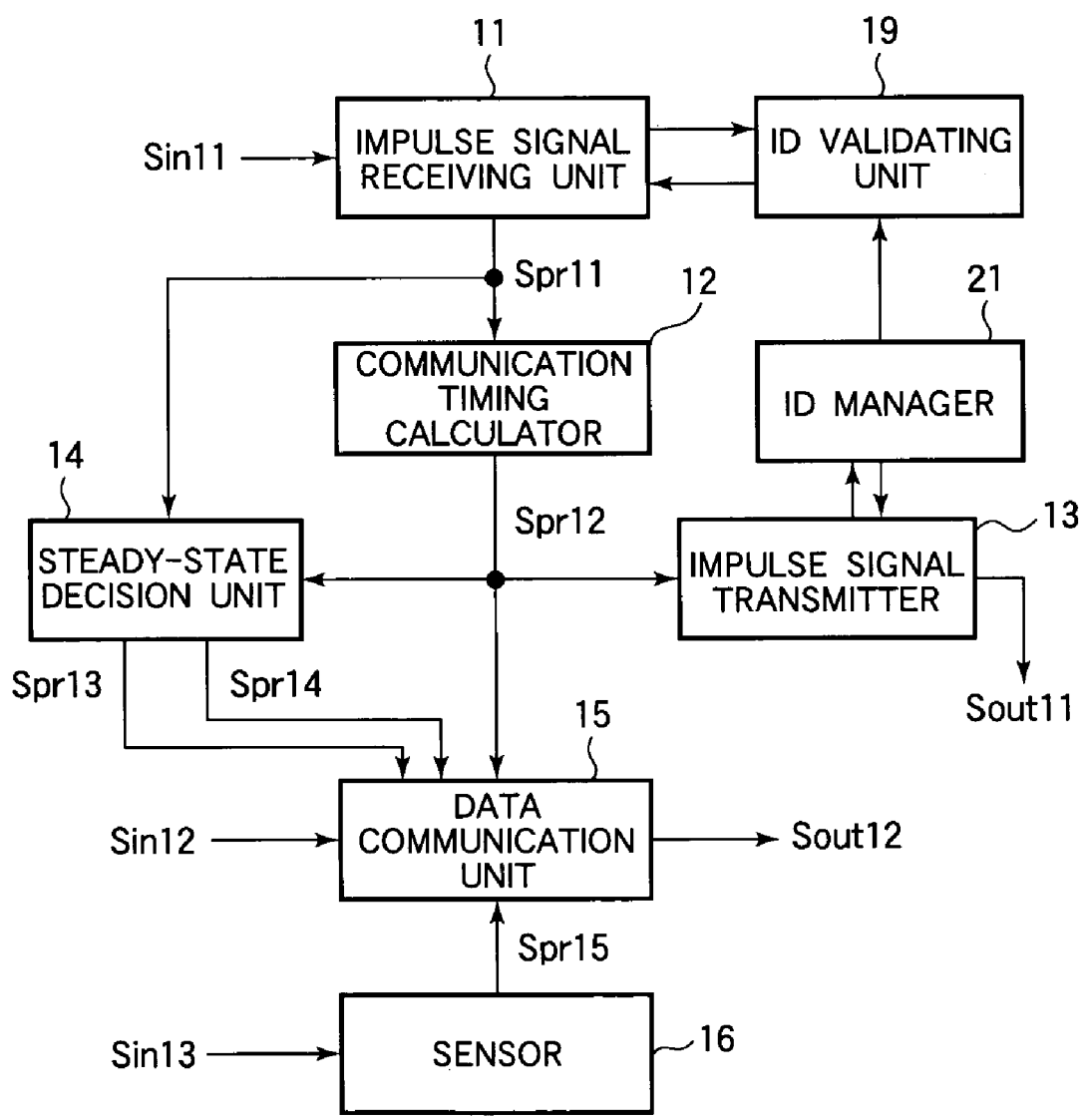
FIG. 13 is a block diagram showing the internal functional structure of a node according to a fifth embodiment of the invention.

Referring to FIG. 13, a node 10D in the fifth embodiment differs from a node in the third embodiment in that the ID generator is replaced with an ID manager 21.

The ID manager 21 stores individual node ID information. The individual node ID information may be the network address of the node, a manufacturing serial number, or any other unique identifier.

When the ID manager 21 receives an ID information request message from the impulse signal transmitter 13, it returns the stored ID information to the impulse signal transmitter 13 and also sends the stored ID information to the ID validating unit 19.

The functions of the constituent elements other than the ID manager 21 are the same as in the third embodiment, except that node identifiers are used as ID information, so descriptions will be omitted.

The fifth embodiment produces substantially the same effects as produced by the third embodiment, and since node identifiers are used as the ID information added to the output impulse signals, the fifth embodiment has the further effect of ensuring that different nodes do not add the same ID information to their output impulse signals.

Sixth Embodiment

The internal structure of a node in the sixth embodiment is the same as in the third embodiment, as illustrated in FIG. 8, but the functions of the ID validating unit 19 and ID generator 20 are altered.

In the third embodiment, the ID information to be added to output impulse signals is generated and stored in the ID generator 20, and the same stored ID information is normally supplied in response to each request from the impulse signal transmitter 13, the ID information being changed only on request from the ID validating unit 19.

Figure 14:
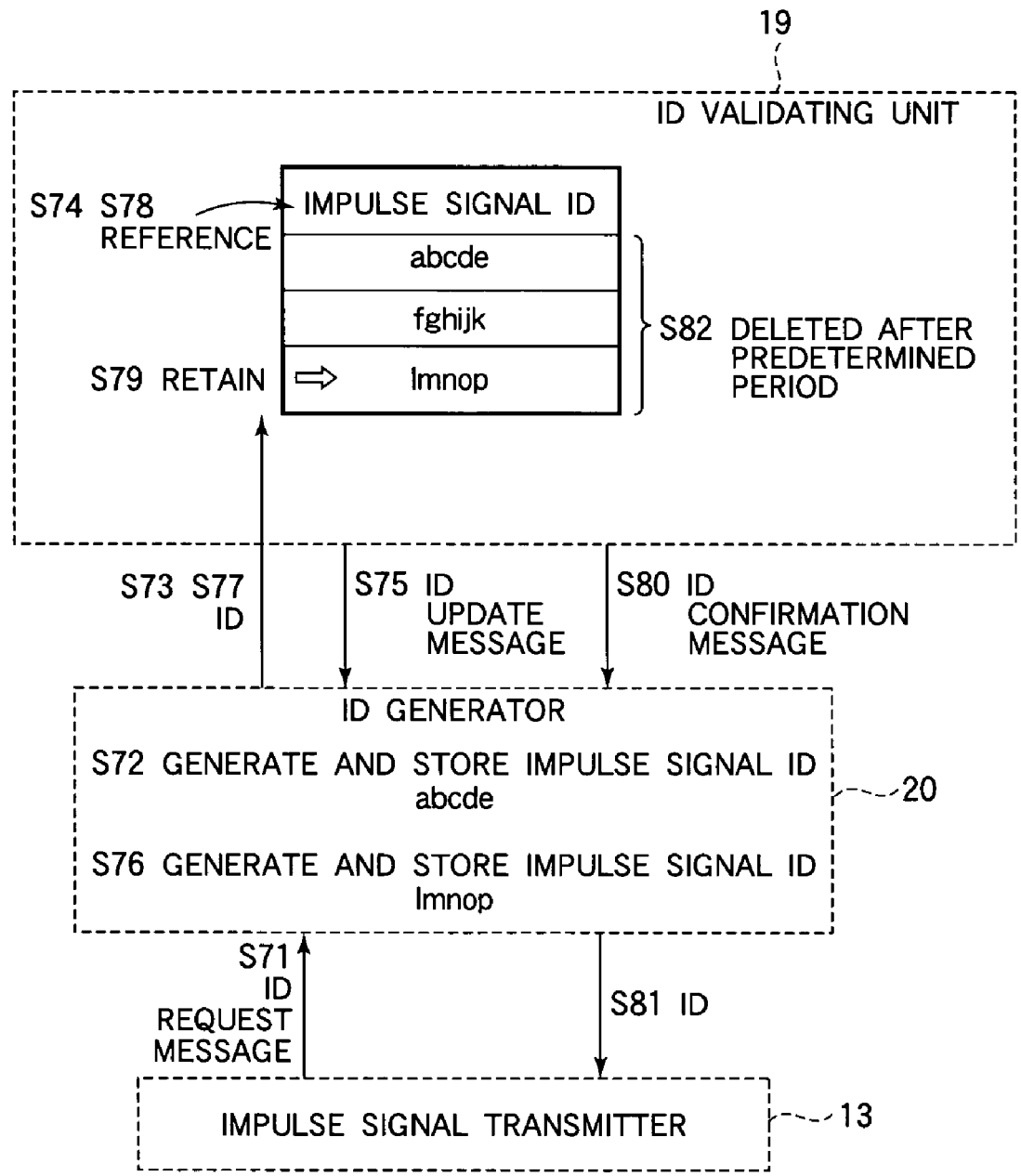
FIG. 14 illustrates the flow of operations involving the ID validating unit at a node in the sixth embodiment.

In the sixth embodiment, a node changes the ID information that it adds to each output impulse signal. The ID validating unit 19 and ID generator 20 cooperate to change the ID information as described below with reference to FIG. 14.

When the ID generator 20 receives an ID information request message from the impulse signal transmitter 13 (step S71), it generates and stores new ID information such as 'abcde' (step S72) and sends the new ID information to the ID validating unit 19 (step S73). The ID validating unit 19 decides whether or not it currently retains the same ID information as the received ID information (step S74). If the ID validating unit 19 already retains the same ID information, it sends an ID information update message to the ID generator 20 (step S75). Upon reception of the ID information update message, the ID generator 20 generates and stores new ID information (e.g., 'lmnop') again (step S76), and sends the new ID information to the ID validating unit 19 again (step S77). The ID validating unit 19 again decides whether or not it already retains the same ID information as the received new ID information (step S78).

If the ID validating unit 19 does not currently retain the same ID information as received from the ID generator 20, it sends an ID information confirmation message to the ID generator 20 (step S80). Upon receipt of the ID information confirmation message, the ID generator 20 sends its stored ID information to the impulse signal transmitter 13 (step S81), and the impulse signal transmitter 13 adds the received ID information to an output impulse signal.

ID information stored in the ID validating unit 19 is deleted when its predetermined retention time expires.

In the sixth embodiment, in addition to the effects of the third embodiment, since each node changes the ID information it adds to its output impulse signals at each impulse signal transmission, impulse signals with the same ID information are unlikely to be transmitted from a plurality of nodes; even if two nodes chance to transmit the same ID information, this is a temporary situation that will correct itself at the next transmission without the need for special remedial action.

Seventh Embodiment

The impulse signals that can interfere with communication timing control include not only impulse signals reflected from walls and the like but also false impulse signals that may be generated by an outside party to attack the communication system. The seventh embodiment adds authentication information to the impulse signals so that bona fide impulse signals can be distinguished from such attacking signals.

Figure 15:
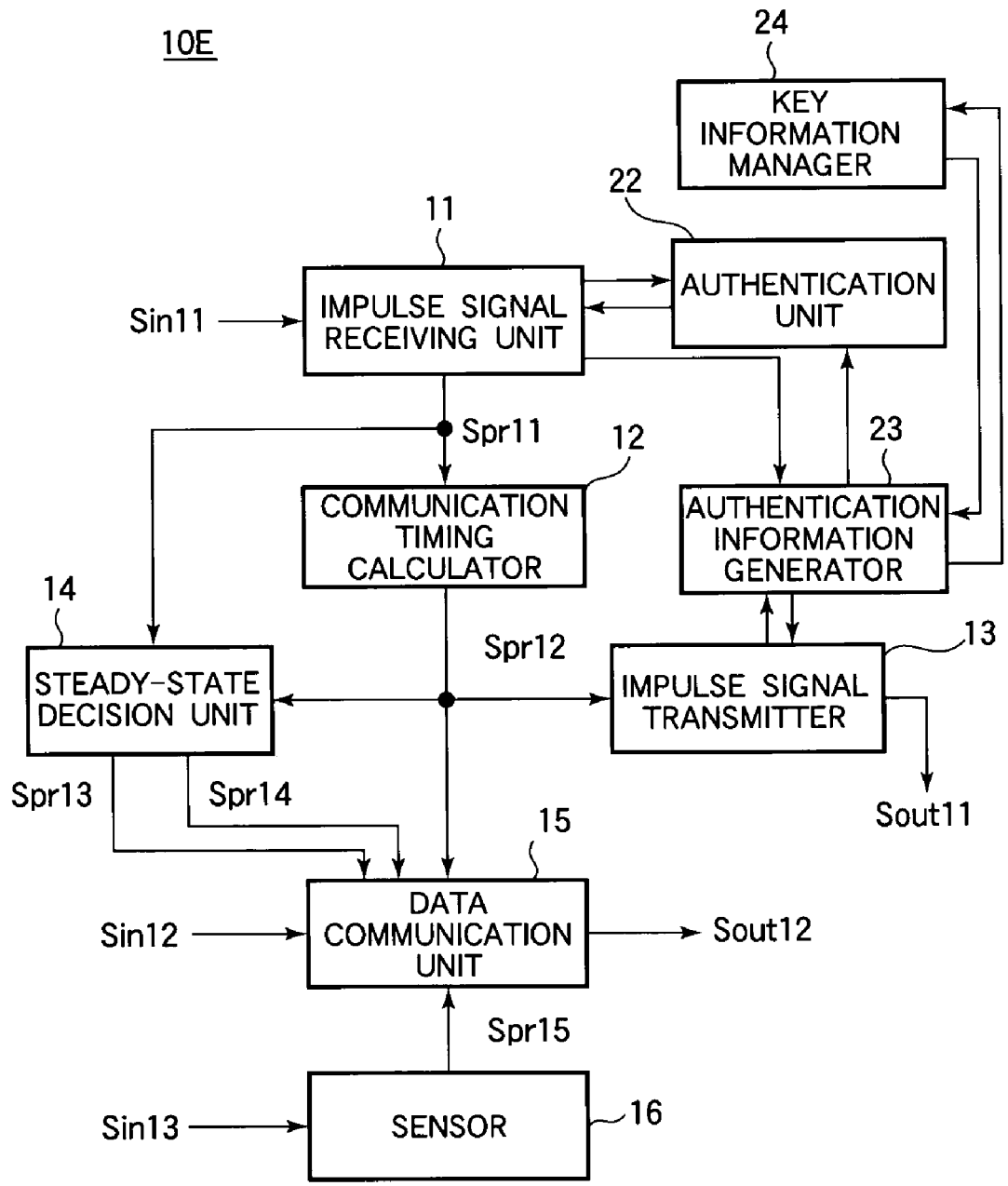
FIG. 15 is a block diagram showing the internal functional structure of a node according to a seventh embodiment of the invention.

Referring to FIG. 15, in a node 10E of the seventh embodiment, the constituent elements for detecting impulse signals that interfere with communication timing control are an authentication unit 22, an authentication information generator 23, and a key information manager 24, and in association with these changes, the functions of the impulse signal receiving unit 11 and impulse signal transmitter 13 are also slightly changed. Other constituent elements are the same as in the third embodiment, so descriptions will be omitted.

An input impulse signal received by the impulse signal receiving unit 11 includes security information such as authentication and other information. For example, the impulse signal waveform may be a concatenated waveform comprising a header information waveform for identification of the signal as an impulse signal, a random number information waveform, and corresponding authentication information. In addition to the above information, the impulse signal may have information specifying a key used to generate the authentication information.

The impulse signal receiving unit 11 strips the authentication information from the impulse signal, sends the impulse signal without the authentication information to the authentication information generator 23, and sends the authentication information to the authentication unit 22 for verification. The authentication unit 22 returns a verification result indicating whether or not the impulse signal is valid. If the impulse signal includes information specifying a key for generating the authentication information, the impulse signal receiving unit 11 sends the key information to the authentication information generator 23. Other operations of the impulse signal receiving unit 11 are the same as in the third embodiment.

The authentication unit 22 verifies whether or not the authentication information added to an impulse signal received from the impulse signal receiving unit 11 matches authentication information received from the authentication information generator 23, and sends the verification result to the impulse signal receiving unit 11. If the two received items of authentication information match, the authentication unit 22 sends the impulse signal receiving unit 11 a verification result of 'valid'; otherwise, it sends a verification result of 'invalid'. The authentication unit 22 may also send an 'invalid' verification result to the impulse signal receiving unit 11 in response to an 'invalid' message from the authentication information generator 23.

The authentication information generator 23 receives stripped-down impulse signals from the impulse signal receiving unit 11, receives key information from the key information manager 24, computes authentication information, and sends the computed result to the authentication unit 22. The authentication information generator 23 also receives impulse signals from the impulse signal transmitter 13 and key information from the key information manager 24, computes authentication information from the impulse signals and key information, and sends the computed result to the impulse signal transmitter 13.

As noted above, the authentication information generator 23 may receive information specifying a key used to generate the authentication information from the impulse signal transmitter 13. In this case, the authentication information generator 23 sends the key specification information to the key information manager 24, and receives the specified key information from the key information manager 24. The authentication information generator 23 may also send the authentication unit 22 a verification message reporting that an impulse signal is invalid because the key information manager 24 does not have the specified key information.

The authentication information generator 23 may also inform the authentication unit 22 that an impulse signal is invalid because, for example, it is identical to an impulse signal received previously, or because it specifies a key that has been discredited by a message received from an internal or external source.

There is no limitation as to the authentication information and the algorithm by which it is computed. However, the same type of authentication information and algorithm must be used in both the node that generates the impulse signal and the node that authenticates the impulse signal. The authentication information may be generated using a secure hash function, for example, or may be a message authenticator generated by combined use of a shared key encryption method and a secure hash function, or a digital signature that combines public key encryption and a secure hash function.

The key information manager 24 manages key information for generating authentication information, and sends key information to the authentication information generator 23. The amount of key information it manages is not limited to one key. The key information manager 24 may also provide key information according to information received from the authentication information generator 23 specifying a key. The key information managed by the key information manager 24 may comprise one or more keys shared by the nodes deserving allocation of time slots, a shared key held only by the node and one other node, or a public key and secret key belonging to the node and public keys of other nodes. The information specifying a key may be information identifying the node that generates an impulse signal.

When the phase signal received from the communication timing calculator 12 reaches a certain value, the impulse signal transmitter 13 generates an impulse signal, and sends it to the authentication information generator 23. The impulse signal transmitter 13 contains a random number generator and places random number information generated thereby in the impulse signal. The impulse signal transmitter 13 may also send information specifying a key to be used for generating authentication information.

The impulse signal transmitter 13 receives the authentication information generated from the impulse signal by the authentication information generator 23, and transmits the impulse signal with the authentication information added as an output impulse signal. The output impulse signal may also include information specifying a key that was used to generate the authentication information.

Operations relating to authentication information in the seventh embodiment will be described with reference to FIG. 16. FIG. 16 shows an example in which an impulse signal contains header information identifying it as an impulse signal, random number information, authentication information, and information specifying a key that was used to generate the authentication information, and the authentication information is generated by a shared key encryption method using specified key information and a secure hash function.

When the impulse signal receiving unit 11 receives an input impulse signal Sin11, it sends the authentication information generator 23 a partial impulse signal R, including the parts of the impulse signal other than the authentication information A (step S91), and sends authentication information A to the authentication unit 22 (step S92).

The authentication information generator 23 now sends the key specifying information in the partial impulse signal R to the key information manager 24 (step S93), and receives key information KEY from the key information manager 24 (step S94). The authentication information generator 23 computes authentication information A' by using the received key information KEY and a function F (step S95). In the example shown in FIG. 16, the function F combines a shared key encryption method and a secure hash function, which is similar to the Keyed-Hashing for Message Authentication (HMAC) function used to assure the integrity of messages, as described in Internet Request For Comments (RFC) 2104.

The authentication information generator 23 sends authentication information A' obtained by the computation to the authentication unit 22 (step S96). The authentication unit 22 compares the authentication information A received from the impulse signal receiving unit 11 with the authentication information A' generated by the authentication information generator 23 (step S97). If authentication information A and A' are identical, the authentication unit 22 notifies the impulse signal receiving unit 11 that the input impulse signal is valid; otherwise, it notifies the impulse signal receiving unit 11 that the input impulse signal is invalid (step S98).

At the transmission timing of an output impulse signal, the impulse signal transmitter 13 generates a random number and key specification information (step S99), adds header information as an identifier indicating that the signal is an impulse signal, and sends the header information, random number, and key specification information together as information R' to the authentication information generator 23 (step S100).

The authentication information generator 23 sends the key specifying information of information R' to the key information manager 24 (step S101), and receives key information KEY' from the key information manager 24 (step S102). The authentication information generator 23 computes authentication information A" by using key information KEY' and the function F (step S103), and returns the authentication information A" obtained by the computation to the impulse signal transmitter 13 (step S104).

The impulse signal transmitter 13 adds the received authentication information A" to information R' and transmits them together as an output impulse signal Sout11.

The seventh embodiment also provides the benefits of autonomous assignment of time slots in each node through mutual communication with the neighboring nodes.

In the seventh embodiment, the authentication information added to the impulse signals exchanged among nodes enables each node to decide whether or not the impulse signals it receives were generated and transmitted by a node to which time slots can be assigned. Therefore, false impulse signals that may be maliciously generated by attackers for the purpose of interference can be eliminated, preventing communication timing control from being disrupted by invalid impulse signals.

Other Embodiments

In the first to sixth embodiments, methods of preventing communication timing control from being confused by reflected impulse signals were described, and in the seventh embodiment, a method of preventing communication timing control from being disrupted by false impulse signals was described separately, but the two types of methods may be used in combination.

The methods described in the first to sixth embodiments detect both reflected impulse signals originating from the node that receives them and reflected impulse signals originating from other nodes, but a node may be structured to detect only one of these types reflected signals.

The present invention can be used in any communication system with nodes that determine their communication timing autonomously by exchanging impulse signals with their neighboring nodes, to eliminate invalid impulse signals that might disturb the communication timing decision process. The method by which the nodes autonomously determine their communication timing is not limited to the method described in the first embodiment. Many variations are possible, several of which are shown in the specification and drawings of Japanese Patent Application No. 2003-328530, for example.

The present invention is directed toward the generation and control of communication timing information (phase signals in the above embodiments) but is not limited to any particular method of using the timing information in communication. For example, if different nodes transmit data signals at different carrier frequencies, their transmissions need not be restricted to time slots; timing information generated by use of the present invention may be employed to determine transmission starting times, so that neighboring nodes do not start transmitting at the same time.

Although the present invention addresses a problem occurring in wireless communication, the invention is also applicable to wired communication.

Those skilled in the art will recognize that further variations are possible within the scope of the invention, which is defined in the appended claims.

What is claimed is:

1. A communication system including a plurality of nodes that transmit data to each other, wherein each one of the nodes includes a communication timing control apparatus comprising:

a state variable signal communication unit for periodically transmitting, to at least another one of the nodes, an output state variable signal, separate from said data, indicating a rhythmic operating state or operating timing of the node including the timing control apparatus, and periodically receiving, from the at least another one of the nodes, an input state variable signal, separate from said data, indicating a rhythmic operating state or operating timing of the at least one other node, wherein the input state variable signal and output state variable signal include identifying information;

a validity decision unit for determining whether each input state variable signal received by the state variable signal communication unit is valid, wherein the validity decision unit includes:

an extracting unit for extracting the identifying information from each input state variable signal;

an identifying unit for adding the identifying information to each output state variable signal; and a storage and decision unit for storing the identifying information extracted from valid input state variable signals and the identifying information added to output state variable signals and deciding whether each input state variable signal is valid by comparing its identifying information with the stored identifying information; and a timing decision unit for causing transitions in the rhythmic operating state or operating timing of the node including the timing control apparatus to occur according to a basic transition rate and the valid input state variable signals received from the at least another one of the nodes, generating the output state variable signal by taking said transitions into account, sending the output state variable signal to the state variable signal communication unit, using said transitions to schedule data transmissions to the at least another one of the nodes, and temporarily modifying the basic transition rate according to the valid input state variable signals received by the state variable communication unit, thereby modifying timings at which the data and output state variables are transmitted from the node including the timing control apparatus, to avoid data collisions.

2. The communication system of claim 1, wherein the storage and decision unit discards the stored identifying information according to a predetermined rule.

3. The communication system of claim 1, wherein the state variable signal generating unit adds to each output state variable signal, as said identifying information, information obtained by performing an operation on the identifying information stored in the storage and decision unit.

4. The communication system of claim 3, wherein the identifying information comprises a count value and the operation comprises incrementing the count value.

5. The communication system of claim 1, wherein the identifying information is a random number.

6. The communication system of claim 5, wherein the identifying unit changes the random number added as identifying information to each output state variable signal each time a new output state variable signal is generated.

7. The communication system of claim 5, wherein:

the storage and decision unit sends an update request to the identifying unit if the random number added as identifying information to an output state variable signal duplicates identifying information already stored in the storage and decision unit; and the state variable signal generating unit changes the random number added as identifying information to each output state variable signal when it receives the update request from the storage and decision unit.

8. The communication system of claim 1, wherein the validity decision unit also generates a duplication signal and sends the duplication signal to the at least one other node when identical identifying information is extracted from two valid input state variable signals.

9. The communication system of claim 1, wherein the identifying information is node identification information.

* * * * *

UNITED STATES PATENT AND TRADEMARK OFFICE

CERTIFICATE OF CORRECTION

| | | |
|---|---|---|
| PATENT NO. | : 7,606,271 B2 | Page 1 of 1 |
| APPLICATION NO. | : 11/072409 | |
| DATED | : October 20, 2009 | |
| INVENTOR(S) | : Yao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this

Fifth Day of October, 2010

David J. Kappos
*Director of the United States Patent and Trademark Office*